United States Patent [19]
Milligan et al.

[11] Patent Number: 5,210,866
[45] Date of Patent: May 11, 1993

[54] INCREMENTAL DISK BACKUP SYSTEM FOR A DYNAMICALLY MAPPED DATA STORAGE SUBSYSTEM

[75] Inventors: Charles A. Milligan, Golden; George A. Rudeseal, Boulder; Jay S. Belsan, Nederland, all of Colo.

[73] Assignee: Storage Technology Corporation, Louisville, Colo.

[21] Appl. No.: 582,260

[22] Filed: Sep. 12, 1990

[51] Int. Cl.$^5$ .............................. G06F 11/20
[52] U.S. Cl. .................. 395/575; 364/285.1; 364/DIG. 1; 364/943.91; 364/944.3; 364/DIG. 2; 371/10.1
[58] Field of Search ............. 395/575; 371/10.1; 364/285.1, 944.3, 943.91

[56] References Cited

U.S. PATENT DOCUMENTS

| | | | |
|---|---|---|---|
| 4,467,421 | 8/1984 | White | 364/200 |
| 4,755,928 | 7/1988 | Johnson et al. | 364/200 |
| 4,819,154 | 4/1989 | Stiffler et al. | 364/200 |
| 4,916,605 | 4/1990 | Beardsley et al. | 364/200 |
| 5,043,871 | 8/1991 | Nishigaki et al. | 364/200 |
| 5,089,958 | 2/1992 | Horton et al. | 395/575 |
| 5,133,065 | 7/1992 | Cheffetz et al. | 395/575 |

*Primary Examiner*—Charles E. Atkinson
*Attorney, Agent, or Firm*—Duft, Graziano & Forest

[57] ABSTRACT

The parallel disk drive array data storage subsystem dynamically maps between virtual and physical data storage devices and schedules the writing of data to these devices. The data storage subsystem functions as a conventional large form factor disk drive memory, using an array of redundancy groups, each containing N+M disk drives. The data storage subsystem does not modify data stored in a redundancy group but simply writes the modified data as a new record in available memory space on another redundancy group. The original data is flagged as obsolete. A mapping table is maintained to identify portions of these redundancy groups which contain newly written or modified virtual track instances. These marked virtual track instances are written to backup medium as a background process and the mapping table is updated to clear the flags that identify these virtual track instances as having been modified.

31 Claims, 18 Drawing Sheets

INCREMENTAL DISK BACKUP SYSTEM FOR A DYNAMICALLY MAPPED DATA STORAGE SUBSYSTEM

CROSS-REFERENCE TO RELATED APPLICATIONS

This patent application is related to application Ser. No. 07/443,933 entitled Data Record Copy Apparatus for a Virtual Memory System, filed Nov. 30, 1989, application Ser. No. 07/443,895 entitled Data Record Move Apparatus for a Virtual Memory System, filed Nov. 30, 1989 and application Ser. No. 07/509,484 entitled Logical Track Write Scheduling System for a Parallel Disk Drive Array Data Storage Subsystem, filed Apr. 16, 1990.

FIELD OF THE INVENTION

This invention relates to cached peripheral data storage subsystems with a dynamically mapped architecture and, in particular, to a method for performing incremental disk backups in this data storage subsystem.

PROBLEM

It is a problem in the field of data storage subsystems to efficiently perform data backups. In data storage subsystems, a standard practice to reliably store data therein is to produce a backup copy of the data that is stored in the data storage subsystem and retain it on another independently operating data storage subsystem or another location within the data storage subsystem. The maintenance of dual copies of the data insure that if one copy is inadvertently destroyed due to a failure of the data storage subsystem or an error on the part of the system operators, another copy of that data is available to the host processors. The backup of a completely redundant copy of the data stored on the data storage subsystem is an expensive proposition since this effectively doubles the cost of storing data. One method of avoiding this cost is to backup only selected volumes of the most critical data for the backup operation. Another alternative is to store only data that has been modified since the last backup operation, thereby retaining, on an incremental basis, an exact copy of what is stored in the data storage subsystem. Both of these alternative solutions provide a much more cost effective way of providing reliable access to a reserve or backup copy of the data that is stored in the data storage subsystem.

Standard data backup software that accomplishes the above stated functions in the above stated manner are efficient because they use multi-track operations and therefore, seeks and rotations on the disks are always kept to a minimum. In a dynamically mapped subsystem, the data is spread randomly among the various disks and the standard data backup programs are therefore less efficient. There are presently no known efficient data backup systems for dynamically mapped data storage subsystems.

SOLUTION

The above described problems are solved and a technical advance achieved in the field by the incremental disk backup system for a dynamically mapped data storage subsystem. The dynamically mapped data storage subsystem consists of a parallel disk drive array data storage subsystem. The parallel disk drive array switchably interconnects a plurality of disk drives into redundancy groups that each contain n+m data and redundancy disk drives. Data records received from the associated host processors are written on logical tracks in a redundancy group that contains an empty logical cylinder. When an associated host processor modifies data records stored in a redundancy group, the data storage subsystem writes the modified data records into empty logical cylinders instead of modifying the data records at their present storage location. The modified data records are collected in a cache memory until a sufficient number of virtual tracks have been modified to write out an entire logical track, whereupon the original data records are tagged as "obsolete". All logical tracks of a single logical cylinder are thus written before any data is scheduled to be written to a different logical cylinder. Therefore, a mapping table is easily maintained in memory to indicate which of the logical cylinders contained in the data storage subsystem contain modified data records and which contain unmodified and obsolete data records. By maintaining the memory map, the data storage subsystem can easily identify which logical cylinders contained in the disk drive array contain modified data records that require backup. This system then reads the mapping table to locate logical cylinders containing modified data records that have not been backed up and writes only these modified logical cylinders to the backup medium. The backup medium can be a tape drive, optical disk with removable platters or any other such data storage device. Once the logical cylinders are backed up in this fashion, the mapping table is reset to indicate that all of the data records contained therein have been backed up.

BRIEF DESCRIPTION OF THE DRAWING

FIG. 14 illustrates a typical free space directory entry.

DETAILED DESCRIPTION OF THE DRAWING

Figure 1:
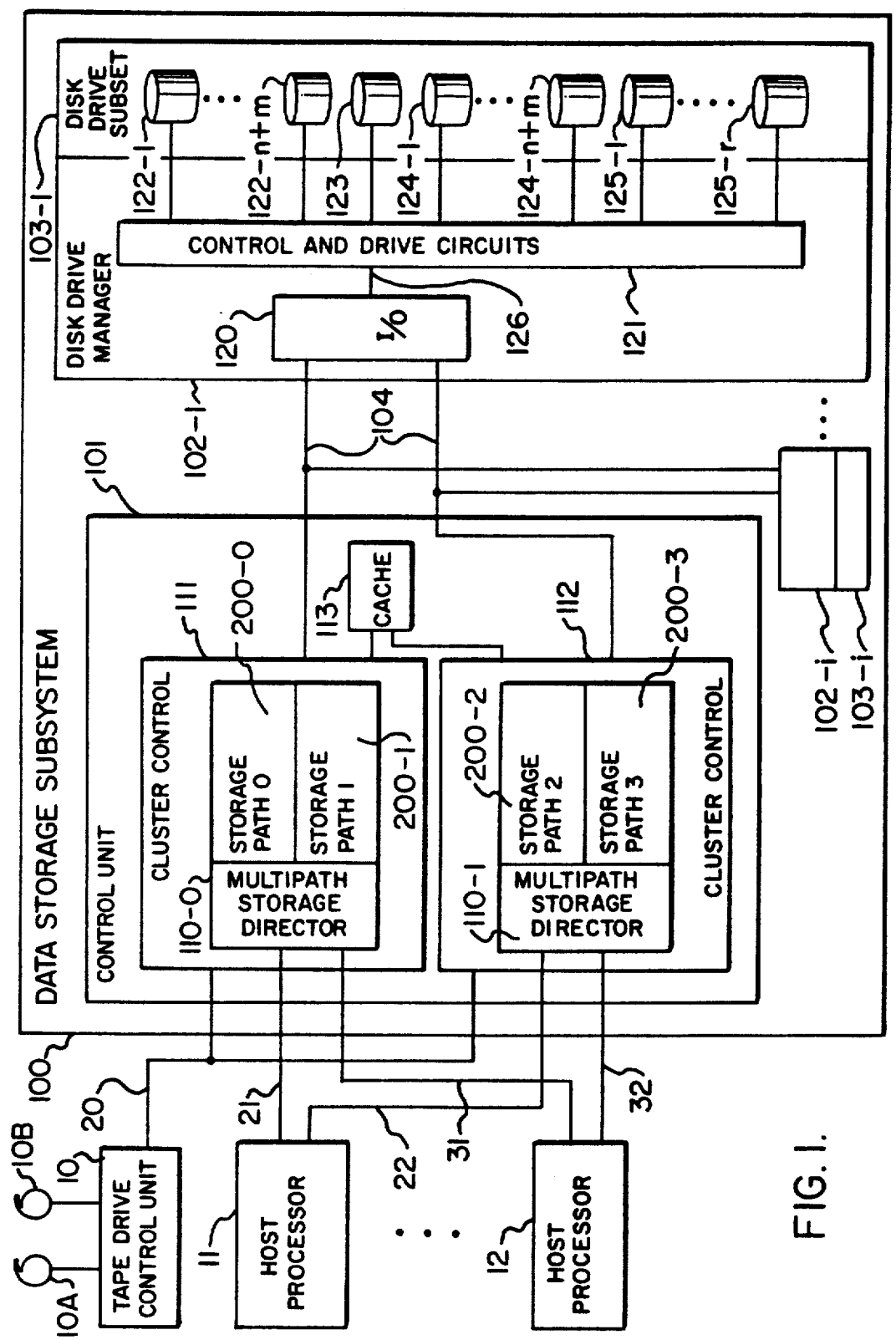
FIG. 1 illustrates in block diagram form the architecture of the parallel disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives. This system avoids the parity update problem of the prior art by never updating the parity. Instead, all new or modified data is written on empty logical tracks and the old data is tagged as obsolete. The resultant "holes" in the logical tracks caused by old data are removed by a background free-space collection process that creates empty logical tracks by collecting valid data into previously emptied logical tracks.

The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives. The redundancy segments are distributed so that every actuator in a redundancy group is used to access some of the data segments stored on the disk drives. If dedicated drives were provided for redundancy segments, then these disk drives would be inactive unless redundancy segments were being read from or written to these drives. However, with distributed redundancy all actuators in a redundancy group are available for data access. In addition, a pool of R globally switchable spare disk drives is maintained in the data storage subsystem to automatically substitute a replacement disk drive for a disk drive in any redundancy group that fails during operation. The pool of R spare disk drives provides high system reliability at low cost.

Each physical disk drive is designed so that it can detect a failure in its operation, which allows the M redundancy segments per logical track to be used for multi-bit error correction. Identification of the failed physical disk drive provides information on the bit position of the errors in the logical track and the redundancy data provides information to correct the errors. Once a failed disk drive in a redundancy group is identified, a backup disk drive from the shared pool of spare disk drives is automatically switched in place of the failed disk drive. Control circuitry reconstructs the data stored on each physical track of the failed disk drive, using the remaining N-1 physical tracks of data plus the associated M physical tracks containing redundancy segments of each logical track. A failure in the redundancy segments does not require data reconstruction, but necessitates regeneration of the redundancy information. The reconstructed data is then written onto the substitute disk drive. The use of spare disk drives increases the system reliability of the N+M parallel disk drive architecture while the use of a shared pool of spare disk drives minimizes the cost of providing the improved reliability.

The parallel disk drive array data storage subsystem includes a data storage management system that provides improved data storage and retrieval performance by dynamically mapping between virtual and physical data storage devices. The parallel diskY drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor which perceives only the virtual image of the disk drive array data storage subsystem.

The performance of this system is enhanced by the use of a cache memory with both volatile and nonvolatile portions and "backend" data staging and destaging processes. Data received from the host processors are stored in the cache memory in the form of modifications to data records already stored in the redundancy groups of the data storage subsystem. No data stored in a redundancy group is modified. A virtual track is staged from a redundancy group into cache. The host then modifies some, perhaps all, of the data records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N-1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Therefore, a mapping table is maintained in memory to indicate which of the logical cylinders contained in the data storage subsystem contain modified data records and which contain obsolete and unmodified data records. By maintaining the memory map, the data storage system can easily identify which logical cylinders contained in the disk drive array contain modified data records that require backup. This system then reads the mapping table to locate logical cylinders containing modified data records that have not been backed up and writes these modified logical cylinders to the backup medium. Once the logical cylinders are backed up in this fashion, the mapping table is reset to indicate that all of the data contained therein has been backed up.

Data Storage Subsystem Architecture

FIG. 1 illustrates in block diagram form the architecture of the preferred embodiment of the parallel disk drive array data storage subsystem 100. The parallel disk drive array data storage subsystem 100 appears to the associated host processors 11-12 to be a collection of large form factor disk drives with their associated storage control, since the architecture of parallel disk drive array data storage subsystem 100 is transparent to the associated host processors 11-12. This parallel disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for spare purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any host processor ex-11 to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101. The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (ex—an IBM 3380K type of disk drive) using a plurality of smaller form factor disk drives while providing a high system reliability capability by writing the data across a plurality of the smaller form factor disk drives. A reliability improvement is also obtained by providing a pool of R spare disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an EDSI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
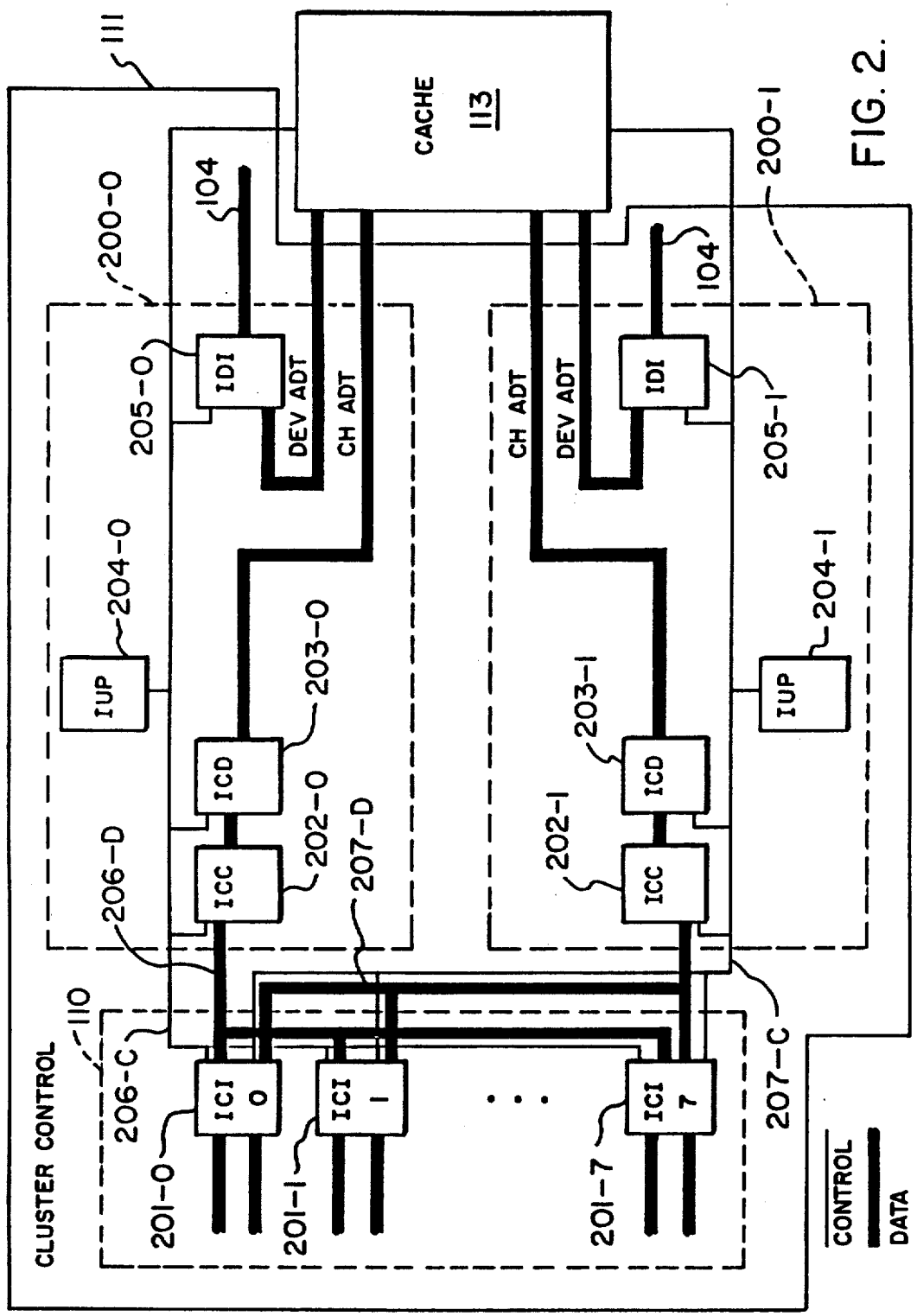
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and the one of channel interface units 201 that is presently active within storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Tape Drive Control Unit Interface

Figure 16:
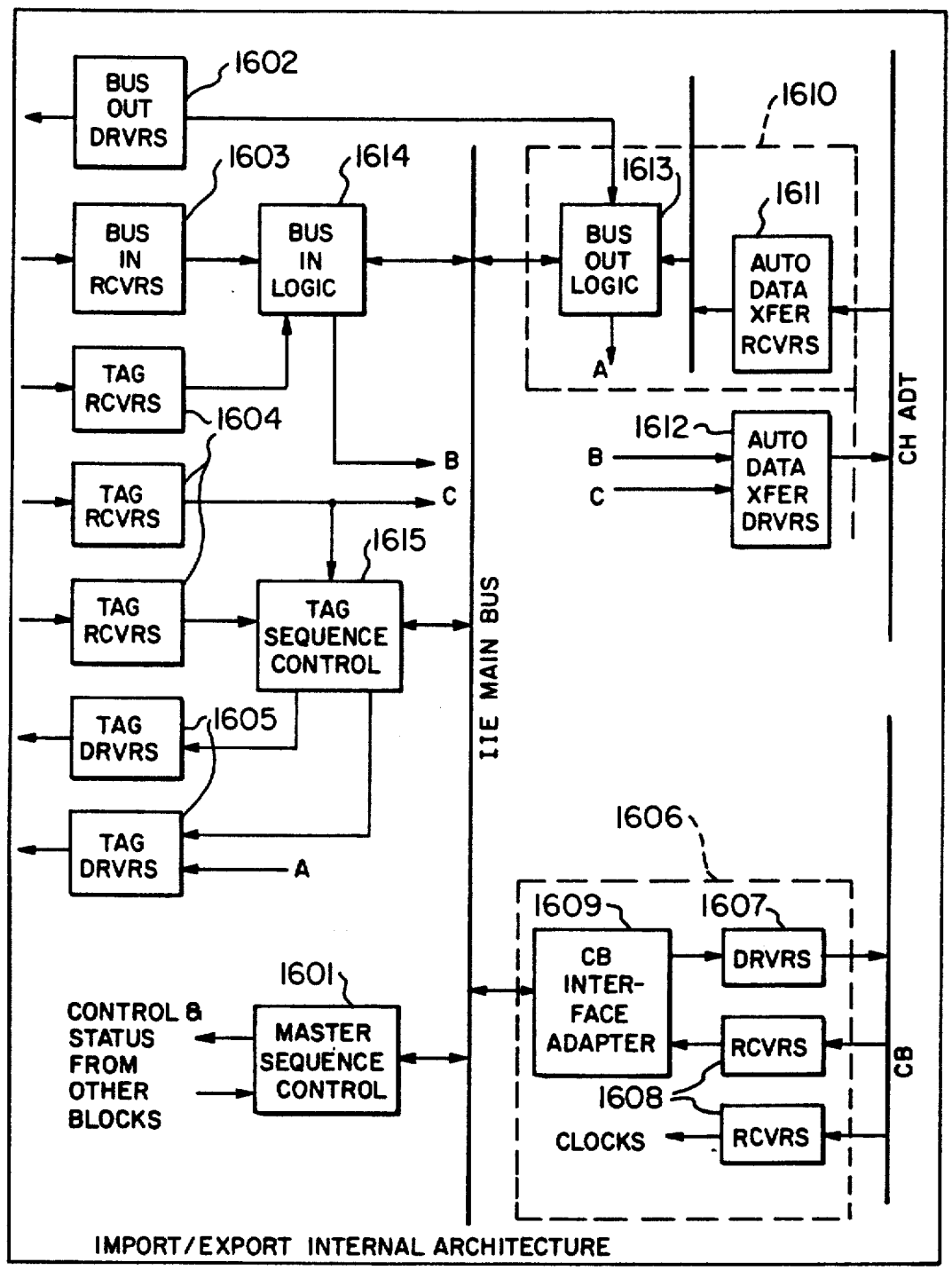
FIG. 16 illustrates additional details of the tape drive control unit interface.

FIG. 16 illustrates in block diagram form additional details of the tape drive control unit interface 208-1 which is connected via data channel 20 to tape drive control unit 10 which interconnects the data channel 20 with a plurality of tape drives (not shown). Tape drive control unit interface 208 is similar in structure to a data channel interface circuits 201 and functions like a host channel interface so that the tape drive control unit 10 believes that data channel 20 is a normal IBM OEMI type channel. FIG. 16 illustrates the master sequence control 1601 which is the main functional control of the tape drive control unit interface circuit 208. All other control function in the tape drive control unit interface circuit 208 are slaves to the master sequence control circuit 1601. Master sequence control 1601 recognizes and responds to sequences of events that occur on the data channel 20 for those initiated by elements within control cluster 111. Master sequence control 1601 contains a microsequencer, instruction memory, bus source and destination decode registers and various other registers as are well known in the art. A plurality of bus input receivers 1603 and bus output drivers 1602 and tag receivers 1604 and drivers 1605 are provided to transmit tag or bus signals to the tape drive control unit 10. These transmitters and receivers conform to the requirements set in the IBM OEMI specification so that normal IBM channels can be used to connect data storage subsystem 100 with a conventional tape drive control unit 10. The details of these drivers and receivers are well known in the art and are not disclosed in any detail herein. Control signals and data from processor 204 in cluster control 111 are received in the tape drive control unit interface 208-1 through the control bus interface 1606 which includes a plurality of drivers and receivers 1607, 1608 and an interface adapter 1609 which contains FIFOs to buffer the data transmitted between the main bus of the tape drive control unit interface circuit 208-1 and data and control busses 206-D, 206-C, respectively. Furthermore, automatic data transfer interface 1610 is used to transfer data between the tape interface drivers and receivers 1602, 1603 and cache memory 113 on bus CH ADT via receivers and transmitters 1611, 1612. Thus, the function of tape drive control unit interface circuit 208-1 is similar to that of channel interface circuits 201 and serve to interconnect a standard tape drive control 10 via data channel 20 to data storage subsystem 100 to exchange data and control information therebetween.

Disk Drive Manager

Figure 3:
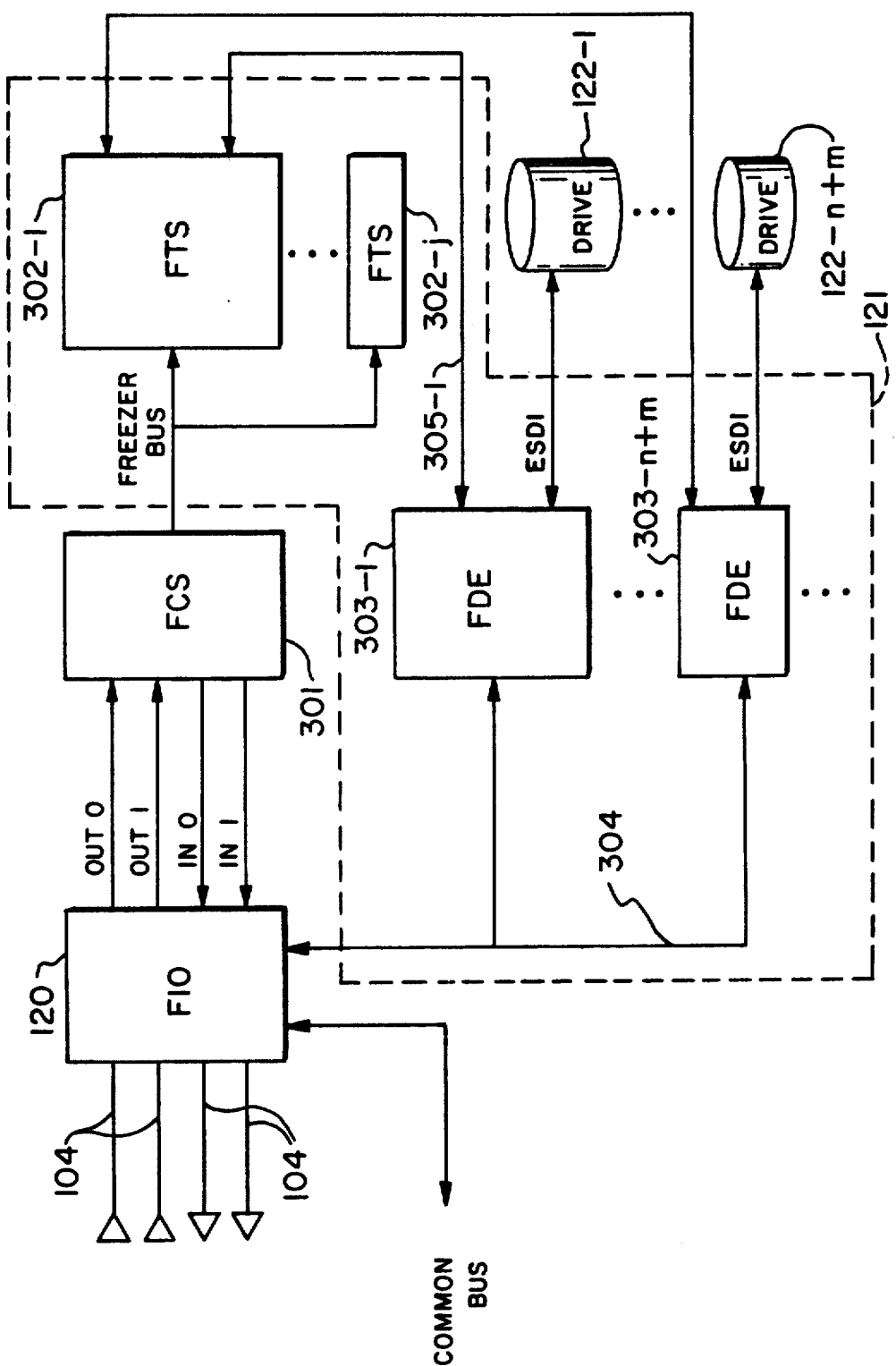
FIG. 3 illustrates the disk drive manager.

FIG. 3 illustrates further block diagram detail of disk drive manager 102-1. Input/output circuit 120 is shown connecting the plurality of optical fiber channels 104 with a number of data and control busses that interconnect input/output circuit 120 with control and drive circuits 121. Control and drive circuits 121 consist of a command and status circuit 301 that monitors and controls the status and command interfaces to the control unit 101. Command and status circuit 301 also collects data from the remaining circuits in disk drive managers 102 and the various disk drives in disk drive subsets 103 for transmission to control unit 101. Control and drive circuits 121 also include a plurality of drive electronics circuits 303, one for each of the commodity disk drives that is used in disk drive subset 103-1. The drive electronics circuits 303 control the data transfer to and from the associated commodity drive via an ESDI interface. The drive electronics circuit 303 is capable of transmitting and receiving frames on the serial interface and contains a microcontroller, track buffer, status and control registers and industry standard commodity drive interface. The drive electronics circuit 303 receives data from the input/output circuit 120 via an associated data bus 304 and control signals via control leads 305. Control and drive circuits 121 also include a plurality of subsystem circuits 302-1 to 302-j, each of which controls a plurality of drive electronics circuits 303. The subsystem circuit 302 controls the request, error and spin up lines for each drive electronics circuit 303. Typically, a subsystem circuit 302 interfaces with thirty-two drive electronics circuits 303. The subsystem circuit 302 also functions to collect environmental sense information for transmission to control unit 101 via command and status circuit 301. Thus, the control and drive circuits 121 in disk drive manager 102-1 perform the data and control signal interface and transmission function between the commodity disk drives of disk drive subset 103-1 and control unit 101.

Command and Status Circuit

Figure 4:
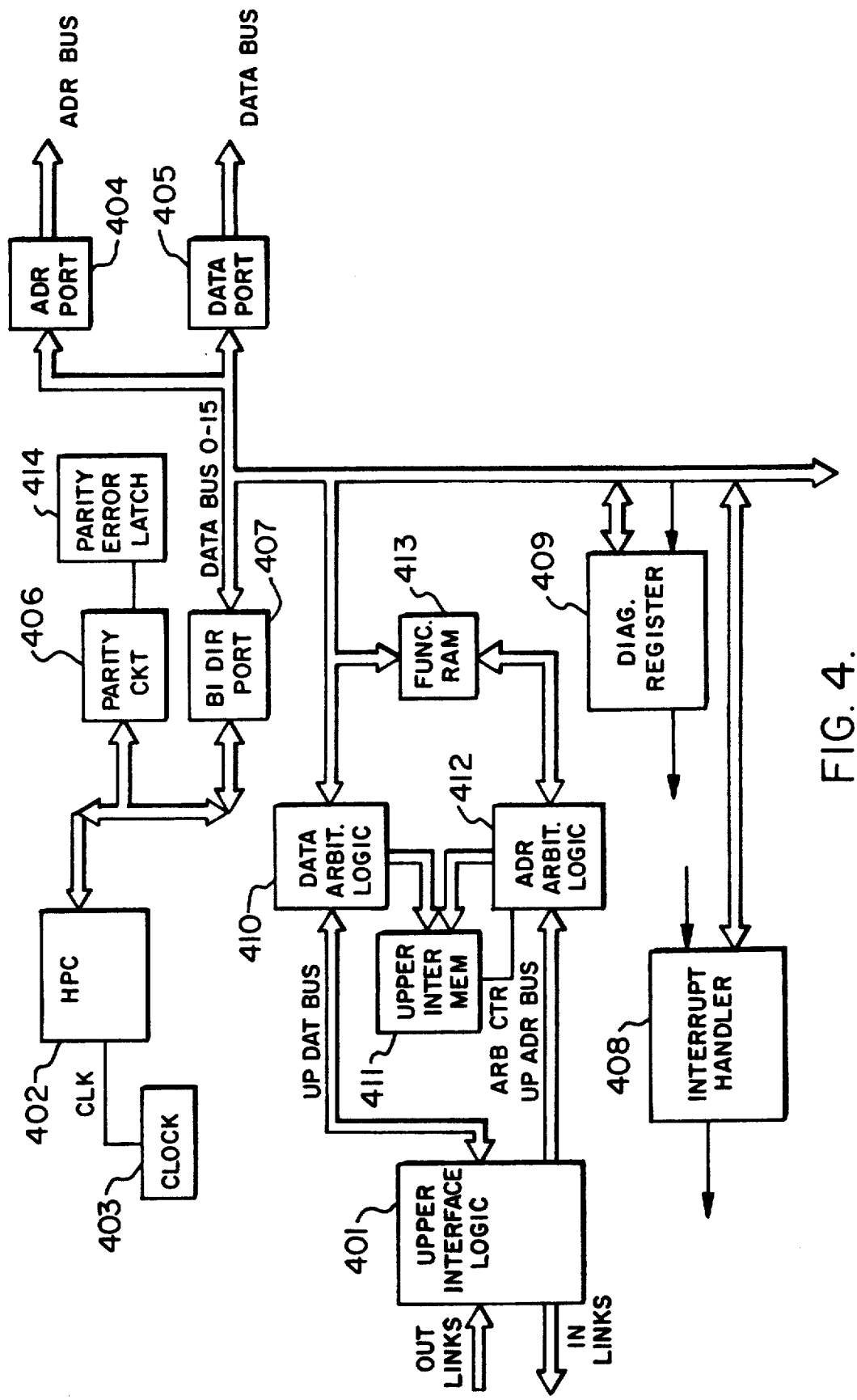
FIG. 4 illustrates the disk drive manager control circuit.

The command and status circuit 301 is illustrated in further detail in FIG. 4. The circuit has three main functions: collect status from the various subsystem circuits 302, report status to control unit 101 and provide diagnostics for disk drive manager 102-1. Command and status circuit 301 is controlled by a processor 402 and its associated clock 403. Processor 402 communicates with the address and data busses via ports 404 and 405 respectively. The direction of communication between processor and the busses and the remaining circuits in command and status circuit 301 is controlled by bidirectional port 407 which acts as an arbiter to regulate access to the internal bus of command and status circuit 301. Similarly, data and address arbitration logic circuits 410 and 412 regulate the access of the interface circuit 401 to the internal data bus of command and status circuit 301. For example, data received from input/output circuit 120 is received by the interface circuit 401 which stores this data in memory 411 via address and data busses that are connected between interface circuit 401 and the data and address arbitration logic 410 and 412. These arbitration circuits regulate access to memory 411 from the internal data bus of command and status circuit 301 and interface circuit 401. Similarly, processor 402 can access the data stored in memory 411 via the internal data bus of command and status circuit 301 and the corresponding data and address arbitration logic 410, 412. This data retrieved by processor 402 can then be output via address and data busses to the subsystem circuits 302 via address and data ports 404, 405 respectively.

Command and status circuit 301 includes interrupt handler 408. All interrupts in disk drive manager 102-1, except for reset, are brought through interrupt handler 408. Interrupt handler 408 collects all interrupts of a particular class which interrupts are read by interrupt software in processor 402. The interrupt software reads the memory mapped space in interrupt handler 408 to determine the bit pattern which indicates what interrupt has occurred.

Drive Electronics Circuit

Figure 5:
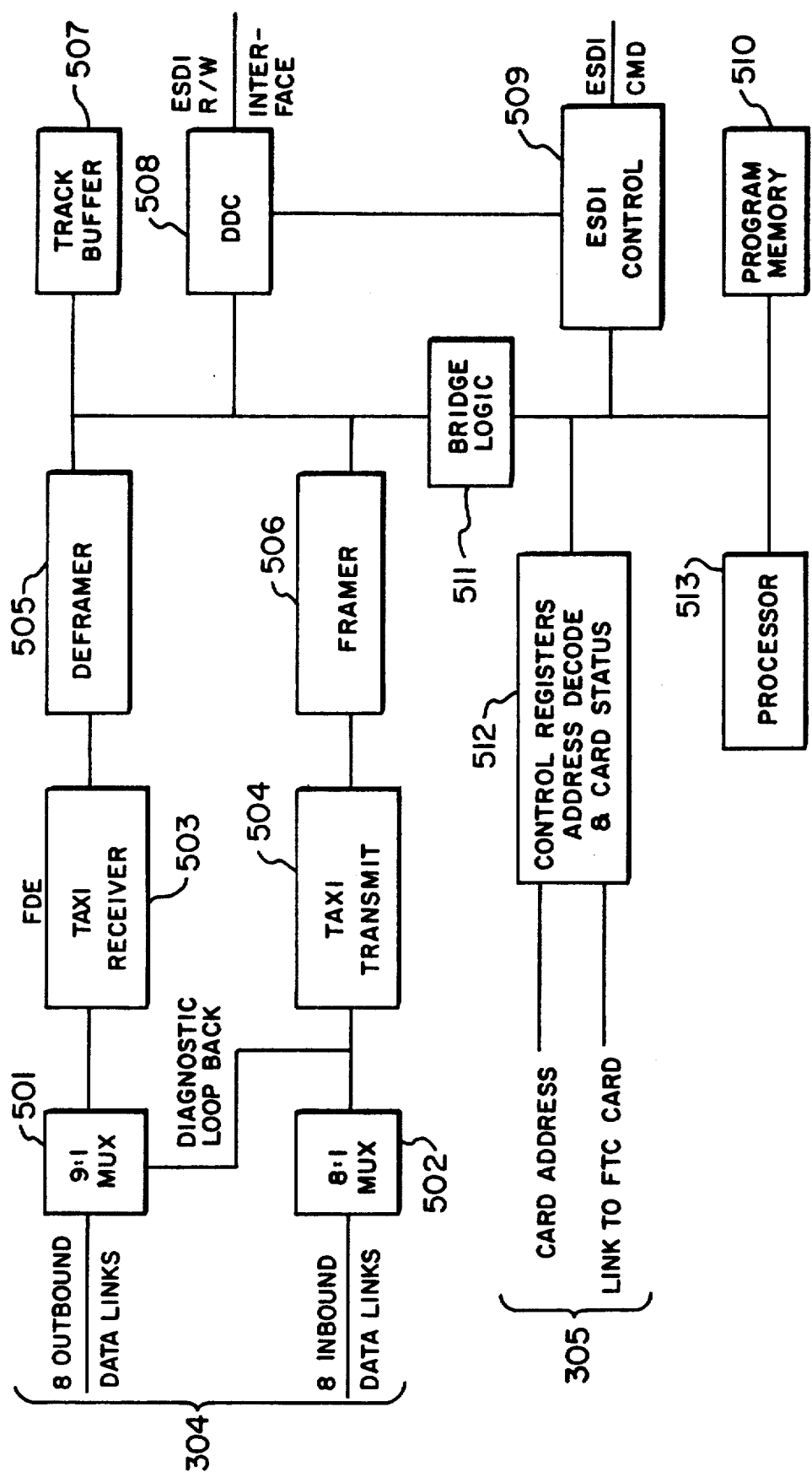
FIG. 5 illustrates the disk drive manager disk control electronics.

The drive electronics circuit 303 functions as an interface between the serial data links 304 that interconnect the input/output circuit 120 and the industry standard commodity disk drive such as drive 122-1. FIG. 5 illustrates additional details of drive electronics circuit 303. The serial data links 304 consist of eight outbound data links and eight inbound data links that are coupled via multiplexers 501 and 502 respectively to the internal circuitry of drive electronics circuit 303. Receiver 503 monitors the outbound data links and converts the information received from input/output circuit 120 into a parallel format for use by deframer circuit 505. Deframer circuit 505 checks if the destination address field in the received frame correlates with the drive electronics circuit's preprogrammed selection address. If the addresses are the same, deframer circuit 505 determines if the information being transmitted is data or a command, then stores the information in track buffer 507 using one of two DMA pointers, one for data storage and the other for command storage. Track buffer circuit 507 is capable of storing one complete physical track of information for transmission to the associated commodity disk drive 122-1. Deframer circuit 505 generates an interrupt when the transfer of a physical track of information is completed. The interrupt generated by deframer 505 is transmitted to processor 513, which interprets the command or data stored in track buffer 507 and acts accordingly. If processor 513 determines that the command is a data transfer command it initializes the control registers 512 for the data transfer. Processor 513 also activates ESDI control circuit 509 which provides the physical interface between the associated commodity disk drive 122-1 and the internal circuit of drive electronics circuit 303-1. Processor 513 also activates disk data controller circuit 508 which functions to interface commodity disk drives with microprocessor controlled systems. The disk data controller 508 is responsible for the data transfer from track buffer 507 to the ESDI control circuit 509. Therefore, the data path is from track buffer 507 through disk data controller 508 and ESDI control circuit 509 to the commodity disk drive 122-1. The ESDI control circuit 509 simply provides the electrical interface between drive electronics circuit 303-1 and disk drive 122-1.

Data transfers from the disk drive 122-1 to input/output circuit 120 are accomplished in similar fashion. The data is read by processor 513 in response to a request for a data read from control unit 101 by addressing the data on disk drive 122-1 via ESDI control circuit 509. The data read from drive 122-1 is routed through ESDI control circuit 509 and disk data controller 508 to track buffer 507 where it is stored until a complete physical track or a meaningful part thereof is stored therein. Framer 506 retrieves the physical track from track buffer 507 and formats and frames this physical track and forwards it to transmitter circuit 504. Transmitter circuit 504 transmits the frames serially through one of the eight inbound data links via multiplexer 502 to input/output circuit 120.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous Count Key Data disk subsystems. The subsystem is free to dedicate its processing resources to increasing performance through more intelligent scheduling and data transfer control.

The parallel disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the parallel disk drive array data storage subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A parallel disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the parallel disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the parallel disk drive array data storage subsystem 100 in order to create entirely free logical cylinders. In order to evenly distribute data transfer activity, the tracks of each virtual device are scattered as uniformly as possible among the logical devices in the parallel disk drive array data storage subsystem 100. In addition, virtual track instances are padded out if necessary to fit into an integral number of physical device sectors. This is to insure that each virtual track instance starts on a sector boundary of the physical device.

Virtual Track Directory

Figure 9:
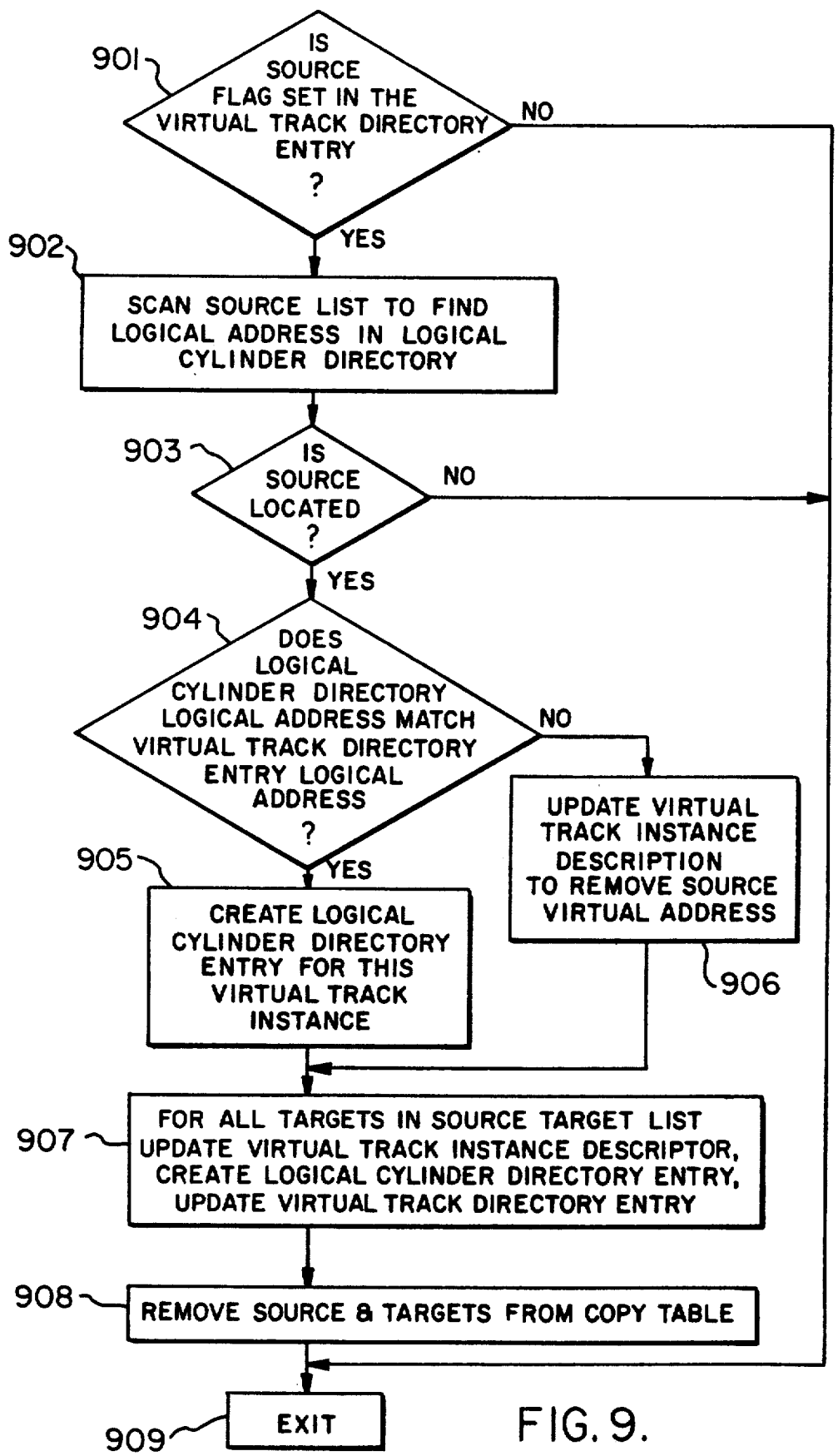
FIG. 9 illustrates the format of the virtual track directory.

FIG. 9 illustrates the format of the virtual track directory 900 that is contained within cache memory 113. The virtual track directory 900 consists of the tables that map the virtual addresses as presented by host processor 11 to the logical drive addresses that is used by control unit 101. There is another mapping that takes place within control unit 101 and this is the logical to physical mapping to translate the logical address defined by the virtual track directory 900 into the exact physical location of the particular disk drive that contains data identified by the host processor 11. The virtual track directory 900 is made up of two parts: the virtual track directory pointers 901 in the virtual device table 902 and the virtual track directory 903 itself. The virtual track directory 903 is not contiguous in cache memory 113 but is scattered about the physical extent of cache memory 113 in predefined segments (ex 903-1). Each segment 903-1 has a virtual to logical mapping for a predetermined number of cylinders, for example 102 cylinders worth of IBM 3380 type DASD tracks. In the virtual device table 902, there are pointers to as many of these segments 903 as needed to emulate the number of cylinders configured for each of the virtual devices defined by host processor 11. The virtual track directory 900 is created by control unit 101 at the virtual device configuration time. When a virtual volume is configured, the number of cylinders in that volume is defined by the host processor 11. A segment 903-1 or a plurality of segments of volatile cache memory 113 are allocated to this virtual volume defined by host processor 11 and the virtual device table 902 is updated with the pointers to identify these segments 903 contained within cache memory 113. Each segment 903 is initialized with no pointers to indicate that the virtual tracks contained on this virtual volume have not yet been written. Each entry 905 in the virtual device table is for a single virtual track and is addressed by the virtual track address. As shown in FIG. 9, each entry 905 is 40 bits long. The entry 905 contents are as follows starting with the high order bits:

| Bits 39:    | In cache flag indicates this track is in cache and the remainder of the VTD entry contains a cache directory entry pointer. |
|-------------|-----|
| Bit 38:     | Source Flag. |
| Bit 37:     | Target Flag. |
| Bits 36-33: | Logical volume number. |
| Bits 32-22: | Logical cylinder address. This entry is identical to the physical cylinder number. |
| Bits 21-7:  | Sector offset. This entry is the offset to the start of the virtual track instance in the logical cylinder, not including the redundancy track sectors. These sectors typically contain 512 bytes. |
| Bits 6-0:   | Virtual track instance size. This entry notes the number of sectors that are required to store this virtual track instance. |

Free Space Directory

The storage control also includes a free space directory (FIG. 8) which is a list of all of the logical cylinders in the parallel disk drive array data storage subsystem 100 ordered by logical device. Each logical device is cataloged in two lists called the free space list and the free cylinder list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. In addition, the free space directory entry contains flag bytes indicative of "cylinder modified" and "cylinder written during backup process" states for this cylinder. The cylinder modified flag indicates that a data record contained within this logical cylinder has been modified since the last incremental disk backup process was performed. The cylinder written during backup flag indicates that Virtual Track Instances modified by host processor 11 were written to this logical cylinder during the execution of the incremental disk backup process. Clearly, the "cylinder modified" flag could be replaced by a set of "track modified" flags, one for each logical track of the logical cylinder, if such granularity were to be considered useful. Similarly, the "cylinder written during backup process" flag could be expanded to a multiplicity of "track written during backup process" flags. This association of "modified" status with logical object (e.g. tracks, cylinders) permits more storage efficient identification of all modified virtual tracks than could be achieved if the modified status were associated directly with each virtual track, for example, in its virtual track directory entry.

The collection of free space is a background process that is implemented in the parallel disk drive array data storage subsystem 100. The free space collection process makes use of the logical cylinder directory, which is a list contained in the last few sectors of each logical cylinder, indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Move/Copy Operation

The data file move/copy operation instantaneously relocates or creates a second instance of a selected data file by merely generating a new set of pointers to reference the same physical memory location as the original set of reference pointers in the virtual track directory. In this fashion, by simply generating a new set of pointers referencing the same physical memory space, the data file can be moved/copied. The copied data file is not marked as modified, instead the copied data file retains the modified or unmodified state that was assigned to the original data file.

This apparatus instantaneously moves the original data file without the time penalty of having to download the data file to the cache memory 113 and write the data file to a new physical memory location. For the purpose of enabling a program to simply access the data file at a different virtual address the use of this mechanism provides a significant time advantage and a physical space savings. A physical copy of the original data record can later be written as a background process to a second memory location, if so desired. Alternatively, when one of the programs that can access the data file writes data to or modifies the data file in any way, the modified copy of a portion of the original data file is written to a new physical memory location and the corresponding address pointers are changed to reflect the new location of this rewritten portion of the data file. In this fashion, a data file can be instantaneously moved/copied by simply creating a new set of memory pointers and the actual physical copying of the data file can take place either as a background process or incrementally as necessary when each virtual track of the data file is modified by one of the programs that accesses the data file.

Virtual Track Directory Source and Target Flags

Each entry in the Virtual Track Directory (VTD) contains two flags associated with the Copy/Move function. The "Source" flag is set whenever a Virtual Track Instance at this Virtual Track Address has been the origin of a copy or move. The Virtual Track Instance pointed to by this entry is not necessarily the Source, but the Virtual Track Instance contains this Virtual Address. If the Source flag is set, there is at least one entry in the Copy Table for this Virtual Address. The "Target" flag is set whenever a Virtual Track Instance contains data that has been the destination of a copy or move. If the Target flag is set, the Virtual Address in the Virtual Track Instance that is pointed to is not that of the VTD Entry.

Copy Table

The format of the Copy Table is illustrated here graphically. The preferred implementation is to have a separate Copy Table for each Logical Device so that there is a Copy Table head and tail pointer associated with each Logical Device; however, the table could just as easily be implemented as a single table for the entire subsystem. The table is ordered such that the sources are in ascending Logical Address order.

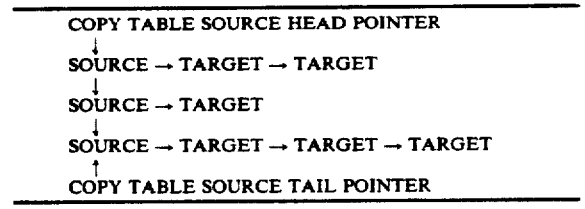

The table is a singly linked list of Sources where each Source is the head of a linked list of Targets. The Source Entry contains the following:
  Logical Address (VTD Entry Copy)
  Virtual Address
  Next Source Pointer (NULL if last Source in list)
  Target Pointer
The Target Entry contains the following:
  Virtual Address
  Next Target Pointer (NULL if last Target in list)
  Update Count Fields Flag

Data Read Operation

Figure 6:
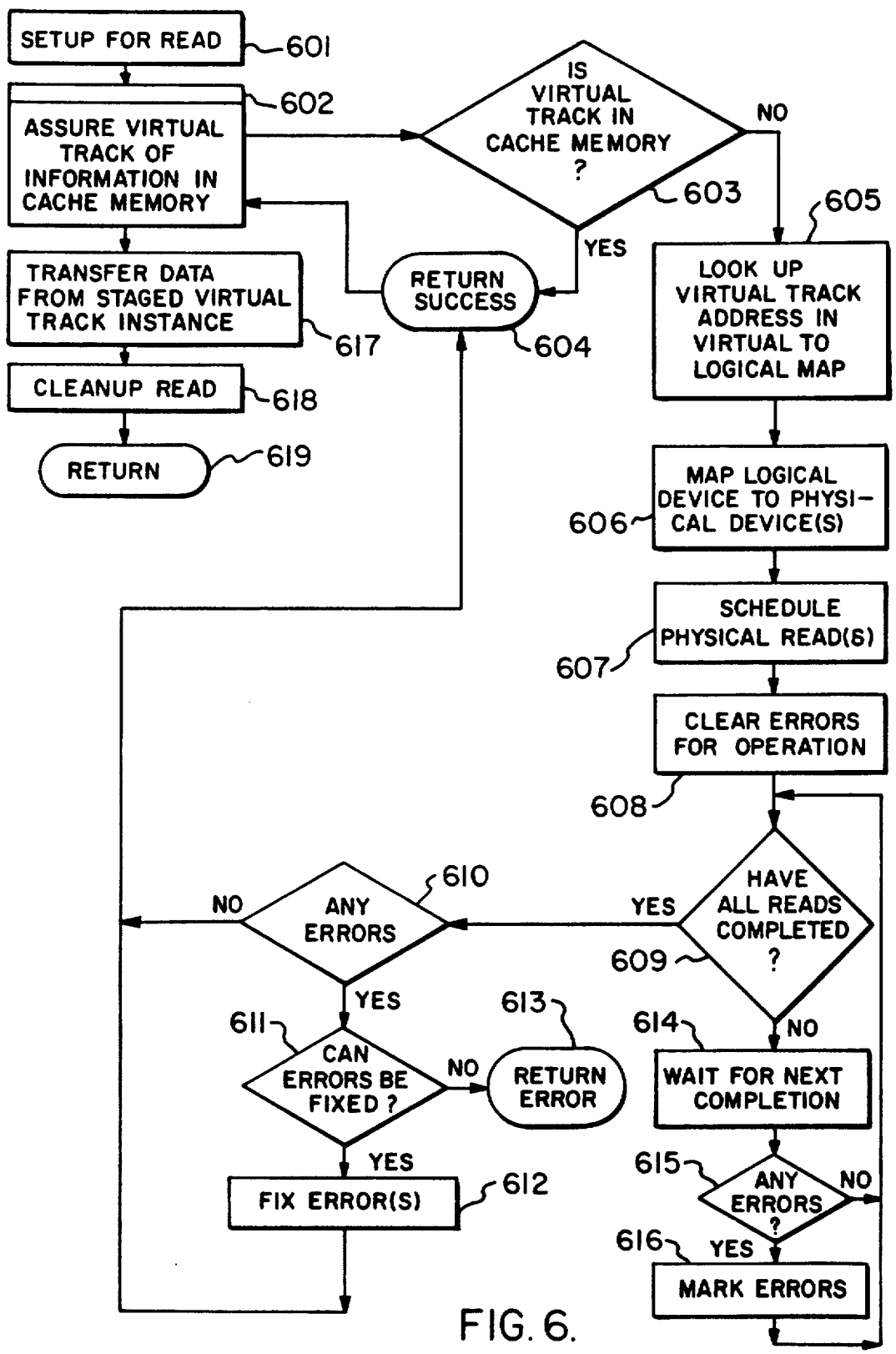
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a data redundancy group 122-1 to 122-n+m in the disk drive subsets 103. The parallel disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 checks the in cache flag in the VTD entry 904 to determine whether the requested virtual track is located in the cache memory 113. If it is, at step 604 control returns back to the main read operation routine and the cache staging subroutine that constitutes steps 605-616 is terminated.

Assume, for the purpose of this description, that the virtual track that has been requested is not located in the cache memory 113. Processing proceeds to step 605 where the control unit 101 looks up the address of the virtual track in the virtual to logical map table. The control unit 101 allocates space in cache memory 113 for the data, relocates the logical address to the cache directory, and loads the Virtual Track Directory entry with a pointer to the cache directory entry for this track. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
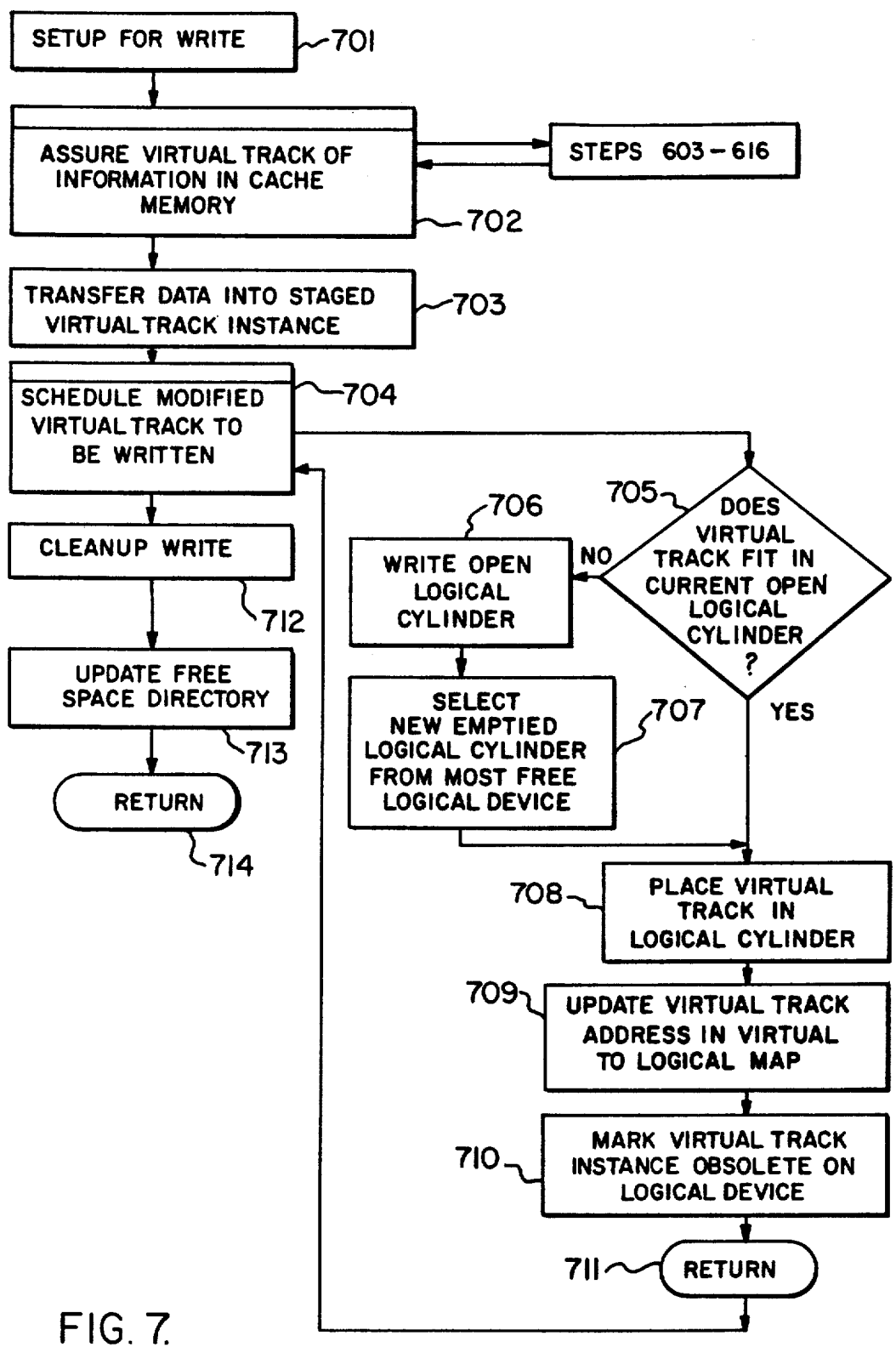

FIG. 7 illustrates in flow diagram form the operational steps taken by the parallel disk drive array data storage subsystem 100 to perform a data write operation. The parallel disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. The modified data record is then transferred into the virtual track modified and this updated virtual track instance is then scheduled to be written from the cache memory 113 where the data record modification has taken place into the logical layer. Once the backend write operation is complete, the location of the obsolete instance of the virtual track is marked as free space. Any clean up of the write operation is then performed once this transfer and write is completed.

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603-616 illustrated in FIG. 6 above.

At step 703, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the parallel disk drive array data storage subsystem 100.

This scheduling is accomplished by the subroutine that consists of steps 705-710. At step 705, the control unit 101 determines whether the virtual track instance as updated fits into an available open logical cylinder. If it does not fit into an available open logical cylinder, then at step 706 this presently open logical cylinder must be closed out and written to the physical layer and another logical cylinder selected from the most free logical device or redundancy group in the parallel disk drive array data storage subsystem 100. At step 707, the selection of a free logical cylinder from the most free logical device takes place. This ensures that the data files received from host processor 11 are distributed across the plurality of redundancy groups in the parallel disk drive array data storage subsystem 100 in an even manner to avoid overloading certain redundancy groups while underloading other redundancy groups. Once a free logical cylinder is available, either being the presently open logical cylinder or a newly selected logical cylinder, then at step 708, the control unit 101 writes the updated virtual track instance into the logical cylinder and at step 709 the new location of the virtual track is placed in the virtual to logical map in order to render it available to the host processors 11-12. At step 710, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11-12. At step 711, control returns to the main routine, where at step 712 the control unit 101 cleans up the remaining administrative tasks to complete the write operation. At step 713, the processor 204 updates the free space directory to reflect the additional free space in the logical cylinder that contained the previous track instance and return to an available state at 714 for further read or write operations from host processor 11.

Free Space Collection

Figure 8:
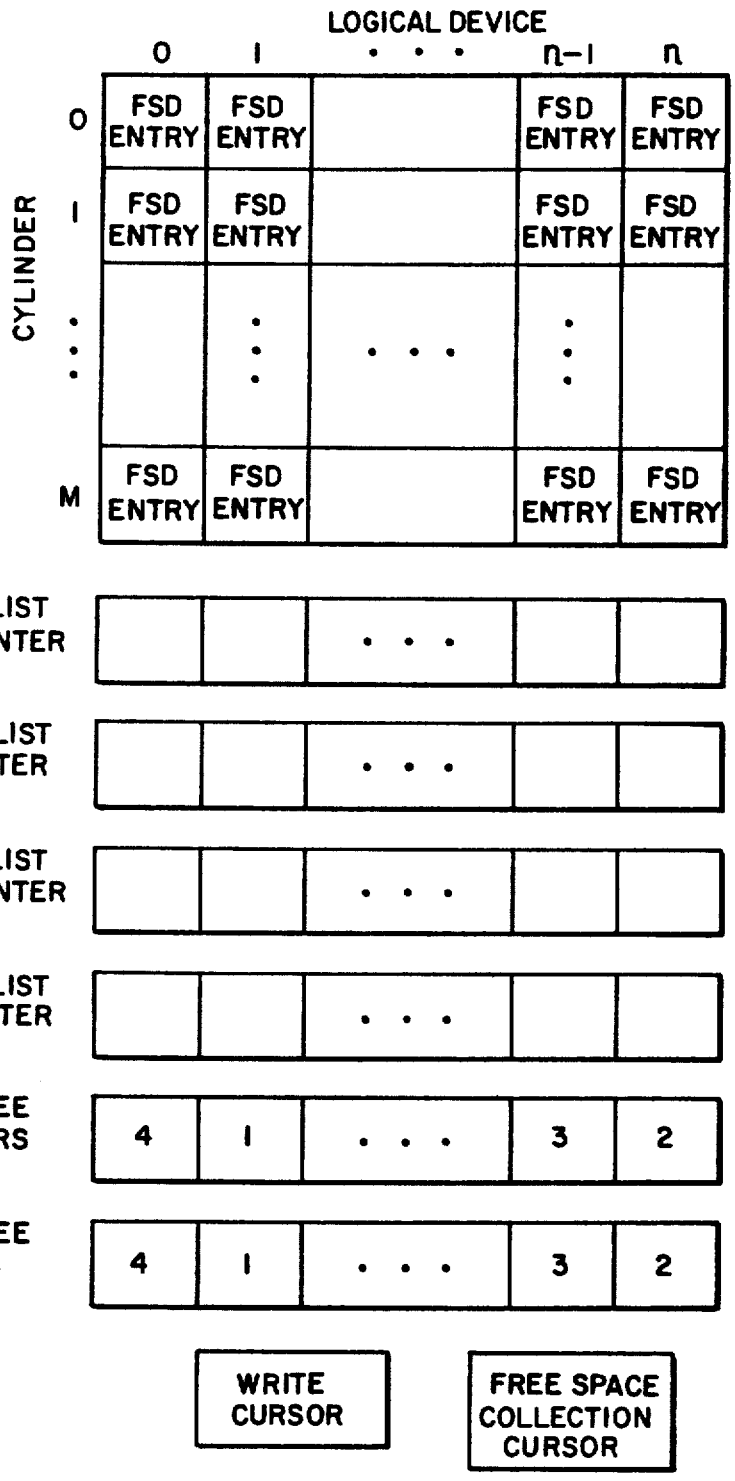
FIG. 8 illustrates a typical free space directory used in the data storage subsystem.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to create completely empty logical cylinders for destaging, the valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11-12 or as part of a free space collection process. In addition, a free space collection cursor is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty and linked into the Free Cylinder List since all of the virtual track instances therein are tagged as obsolete. Additional logical cylinders are collected for free space collection purposes or as data is received from an associated host processor 11-12 until a complete logical cylinder has been filled. Once a complete logical cylinder has been filled, a new previously emptied logical cylinder is chosen.

Figure 10:
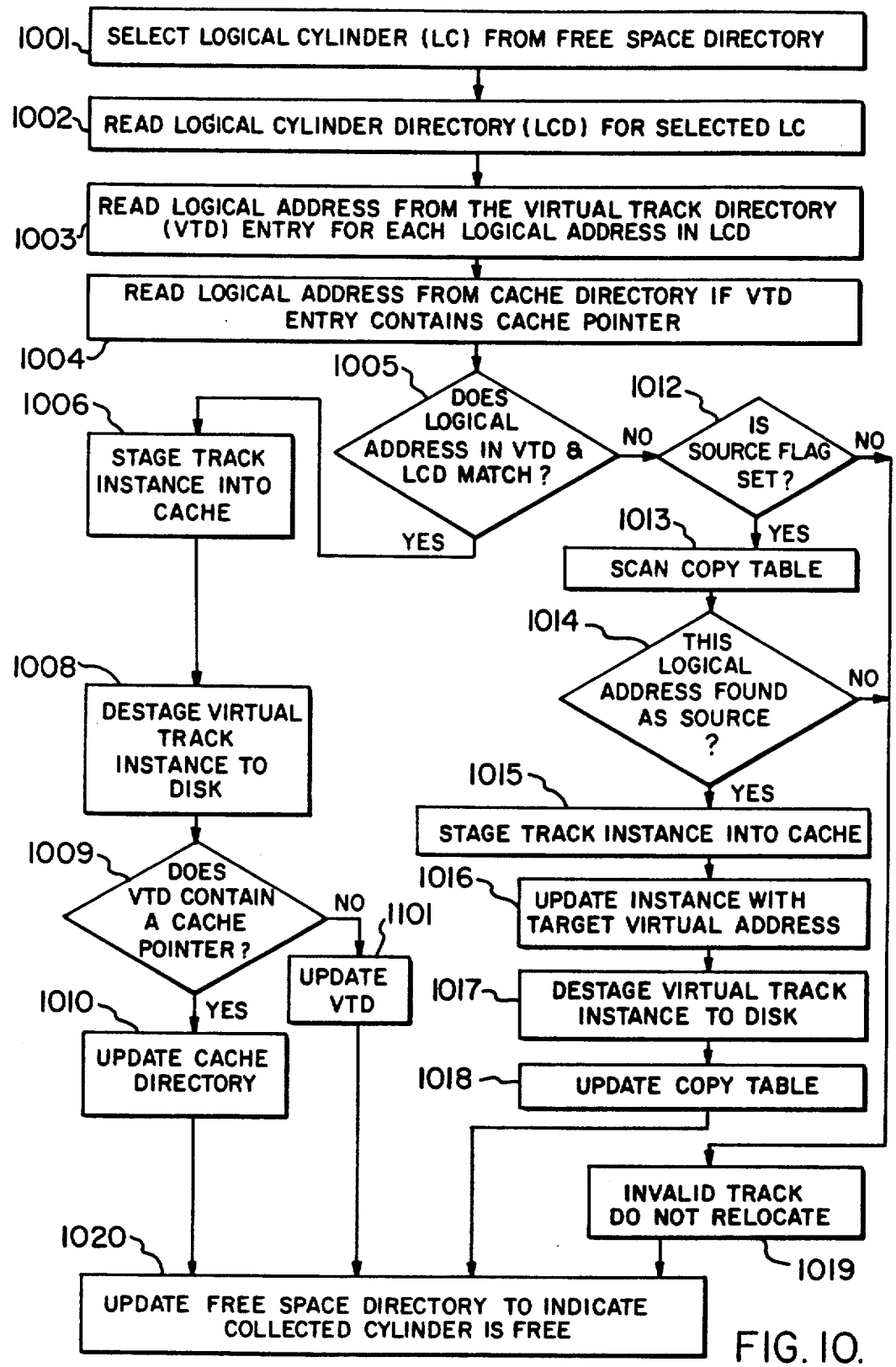
FIGS. 10 and 11 illustrates, in flow diagram form, the free space collection process.
Figure 11:
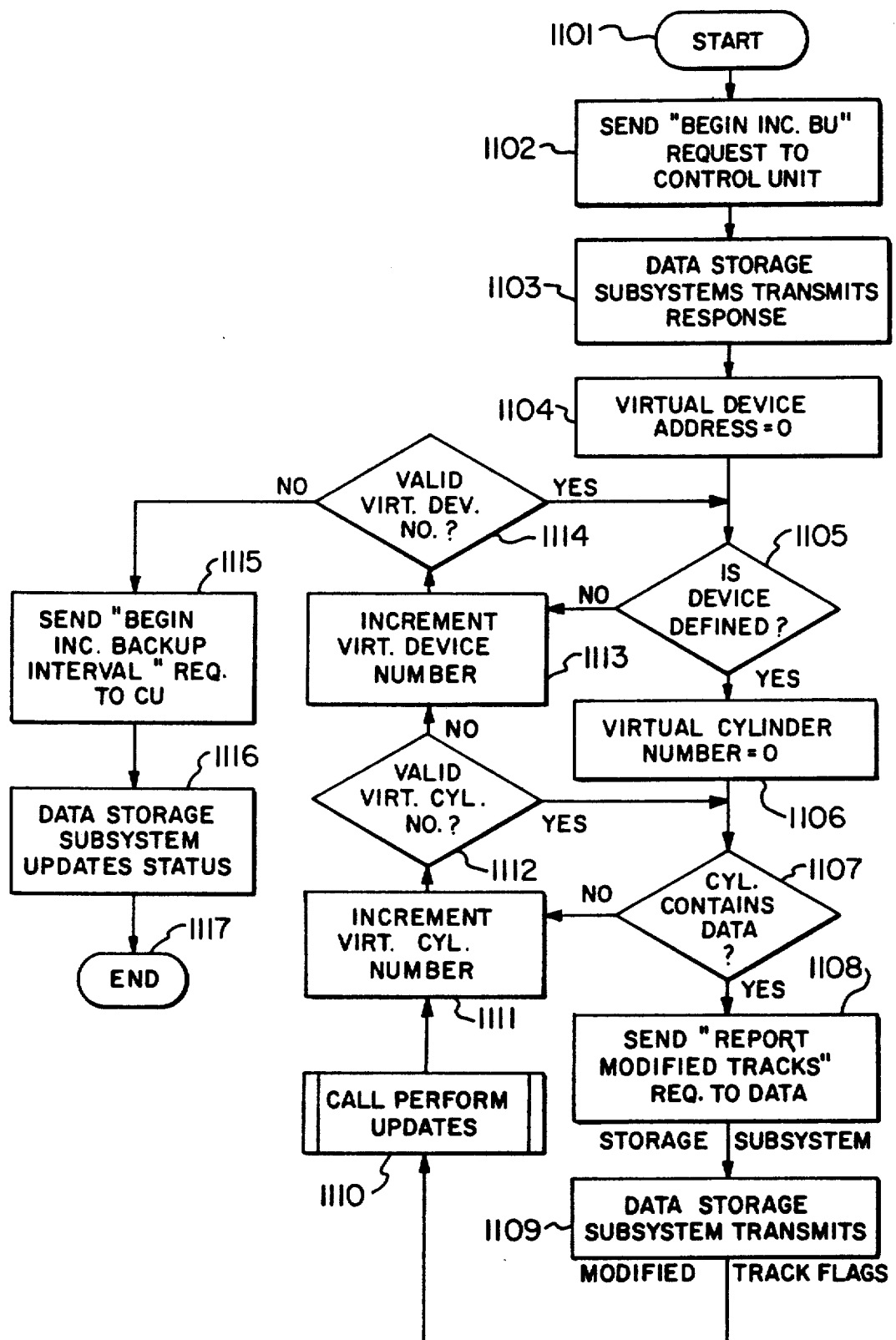

FIGS. 10 and 11 illustrate in flow diagram form the operational steps taken by processor 204 to implement the free space collection process. The use of Source and Target Flags is necessitated by the free space collection process since this process must determine whether each virtual track instance contains valid or obsolete data. In addition, the free space collection process performs the move/copy count field adjustment operations listed in the copy table.

When Free Space collection has to be done, the best logical cylinder to collect is the one with the most sectors already free. This leads to the notion of a list of all of the logical cylinders in data storage subsystem 100 ordered by the amount of Free Space each contains. Actually, a list is maintained for each logical device, since it is desirable to balance free space across logical devices to spread virtual actuator contention as evenly as possible over the logical actuators. The collection of lists is called the Free Space Directory; the list for each logical device is called the Free Space List for the logical device. Each free space entry represents one logical cylinder. Each free space directory entry (FIG. 18) contains a forward and backward pointer to create a doubly linked list as well as a cylinder modified flag and a cylinder written during backup flag. Each logical device's Free Space List is terminated by both head and tail pointers.

Each logical cylinder contains in its last few sectors a directory of its contents, called its Logical Cylinder Directory (LCD). This directory contains an entry for each virtual track instance contained within the logical cylinder. The entry for a virtual track instance contains the identifier of the virtual track and the identifier of the relative sector within the logical cylinder in which the virtual track instance begins. From this directory and the Virtual Track Directory, the Free Space Collection Process can determine which virtual track instances are still current in the logical cylinder and therefore need to be moved to make the logical cylinder available for writing new data.

The basic process is initiated at step 1001 when processor 204 selects a Logical Cylinder (LC) for collection based on the number of free logical sectors as listed in the Free Space Directory table of FIG. 8. At step 1002, processor 204 reads the logical cylinder directory for the logical cylinder that was selected at step 1001. Processor 204 then at step 1003 reads the logical address from the virtual track directory (VTD) entry for each virtual track address that is contained in the read logical cylinder directory. At step 1004, if the virtual track directory entry contains a cache pointer, the logical address is read from cache directory where it was relocated during the staging process. At step 1005, processor 204 compares the logical address that was stored in the virtual track directory entry with the logical address that was stored in the logical cylinder directory. If these two addresses do not match, that indicates the track instance is not valid for this virtual address; however, this track instance may need to be retained if it was the source of a copy or move. This is accomplished in the process illustrated in steps 1012 to 1017.

At step 1012, processor 204 determines whether the source flag in the virtual track directory entry is set. If not, this is an invalid track and at step 1017 processor 204 determines that this track should not be relocated and execution exits. If, at step 1012, processor 204 determines that the source flag in the virtual track directory entry is set, then at step 1013 processor 204 scans the source list to find the logical address in the logical cylinder directory. If the virtual track located in this scanning process is still a source at step 1014, then at step 1015 the virtual track instance is staged into predetermined location in cache memory 113. At step 1016, processor 204 removes the invalid virtual address from the virtual track descriptor and replaces it with the valid virtual 61 addresses from the target entries in the copy table. At step 1017, processor 204 destages the updated virtual track instance to the disk drive subset 103 that contains the logical cylinder used by this free space collection process. In addition, processor 204 creates a logical cylinder directory entry for this virtual track instance. Finally, processor 204 updates the virtual track directory entry for the target to point to the new location and clears the target flag. Once all of these record updates are accomplished, processor 204 removes this source and all its targets from the copy table. Processor 204 also scans the copy table for sources with the same virtual address and, if there are none, clears the source flag. These changes to the virtual track directory and to the copy table are journaled in the non-volatile portion of cache memory 113.

If, at step 1005, processor 204 determines that the virtual address stored in the virtual track descriptor matches the virtual address stored in the logical cylinder directory, at step 1006 the virtual track instance is staged into a predetermined location in cache memory 113. At step 1008, processor 204 destages the virtual track instance to the disk drive subset 103 that contains the logical cylinder used by this free space collection process. At step 1009, processor 204 determines whether the virtual track directory entry contains a cache pointer. If it does not, at step 1011, processor 204 updates the virtual track directory entry and exits at step 1020. If the virtual track directory entry does contain a cache pointer, at step 1010, processor 204 updates the cache directory and exits to step 1020. At step 1020, processor 204 updates the free space directory to indicate that the collected cylinder is now a free cylinder available for data storage purposes and the data previously contained therein has been collected to a designated logical cylinder and the appropriate mapping table entries have been updated. The free space collection process does not cause the cylinder modified flag to be set for the collection logical cylinder unless this flag was previously set for the collected logical cylinder.

Incremental Disk Backup

The data storage subsystem 100 writes modified virtual tracks from cache memory 113 into empty logical cylinders in the disk drive subset 103-1. Therefore, it is an easy task to mark which logical cylinders in the data storage subsystem 100 contain modified data. This is accomplished by maintaining a mapping table that denotes all of the logical cylinders in the data storage subsystem 100 and their modified and backup status. By noting which of the logical cylinders in the data storage subsystem 100 have been modified, the subsystem can easily determine which Virtual Track Instances on the logical cylinders require backup. In the data processing system, the modifications to the data contained therein are stored on a periodic and regular basis on a backup medium. This backup medium can be other redundancy groups in the data storage subsystem 100 or outboard archive medium such as tape. In either case, such backup systems store only the modifications or modified data rather than requiring a complete dump of all of the contents of the data storage subsystem.

Incremental Backup Procedure-Host Processor

At step 1101 on FIGS. 12-15, the host processor 11 enters the incremental backup routine to perform a data backup process for only those tracks on which modified data has been written. At step 1102, the host processor 11 transmits a begin incremental backup request command to data storage subsystem 100 over channel 21. The control unit 101 in data storage subsystem 100 receives this command from host processor 11 and sets the perform backup process flag to indicate that an associated host processor is requesting backup of data storage thereon. In addition, data storage subsystem 100 transmits a signal to the host processor over channel 21 to indicate that the incremental disk backup process has been initiated within data storage subsystem 100. At step 1104, host processor 11 sets the virtual device address to 0 and at step 1105 determines whether this device is defined for data storage subsystem 100. If this device is not defined the virtual device number is incremented at step 1113 and a determination is made at 1114 whether this represents a valid virtual device number. If it does, processing returns to step 1108 where host processor 11 again determines whether this virtual device is defined for data storage subsystem 100. Assuming for the purpose of this discussion that this virtual device is defined, processing advances to step 1006 where host processor 11 sets the virtual cylinder number to 0 . At step 1107, host processor 11 determines from its internal tables whether this virtual cylinder contains data. If no data is contained therein at step 1111, the host processor 11 increments the virtual cylinder number and processes to step wherein it determines whether this is a valid virtual cylinder. If it is not, processing proceeds to step 1113 as described above. Assume that a valid virtual cylinder number is defined and this cylinder contains data. At this point, host processor 11 advances to step 1108 where it transmits a report modified tracks request to data storage subsystem 100 and, in particular, control unit 101. In response to the request to report modified tracks, control unit 101 transmits data indicative of all of the tracks contained within this virtual cylinder that have been modified since the last backup procedure was performed. Additional details about this process are described hereinbelow. In response to control unit 101 transmitting a list of the modified tracks to host processor 11 over channel 21 at step 1109, host processor 11 initiates the perform updates subroutine at step 1110 which subroutine is described below. This subroutine updates the status information contained within host processor with respect to the virtual device cylinder and tracks defined in the above process. The host processor also schedules reads of the tracks reported as modified and writes of these tracks to the backup medium. Once the host processor 11 updates the backup status of these particular tracks, at step 1110, processing advances to step 1111 where the virtual cylinder number is incremented and thence to step 11-12 wherein host processor 11 determines whether this is a valid virtual cylinder number. Steps 1107 to 1112 are repeated until all of the virtual cylinders within this virtual device have been identified to control unit 101 and the modified track status of these virtual cylinders reported back to host processor 11. Once all the virtual cylinders have been thereby addressed, processing advances to step 1113 where the virtual device number is incremented and steps 1105–1113 are performed for all of the virtual devices within data storage subsystem 100. Thus, the program steps illustrated in FIG. 11 consist of several nested subroutines wherein host processor 11 updates the status of each virtual device contained in data storage subsystem 100 and, for each virtual device updates the status of all of the tracks contained in each virtual cylinder contained in that particular virtual device. Once all of the virtual devices have been addressed by host processor 11, at step 1114 processing branches to step 1115 where host processor 11 transmits a begin incremental backup interval command to control unit 101. This command requests control unit 101 to update the backup status contained therein for all of the modified tracks identified during the processing of steps 1104–1114. Once this data storage subsystem update is completed, control unit 101 transmits a signal to host processor 11 at step 1116 over channel 21 to indicate that the data storage subsystem 100 has stored therein backup data identical to that stored in host processor 11 in that backup status of the data contained in data storage subsystem 100 is consistent with the indicator stored in host processor 11 indicative of this backup status.

Report Modified Tracks Subroutine

Figure 12:
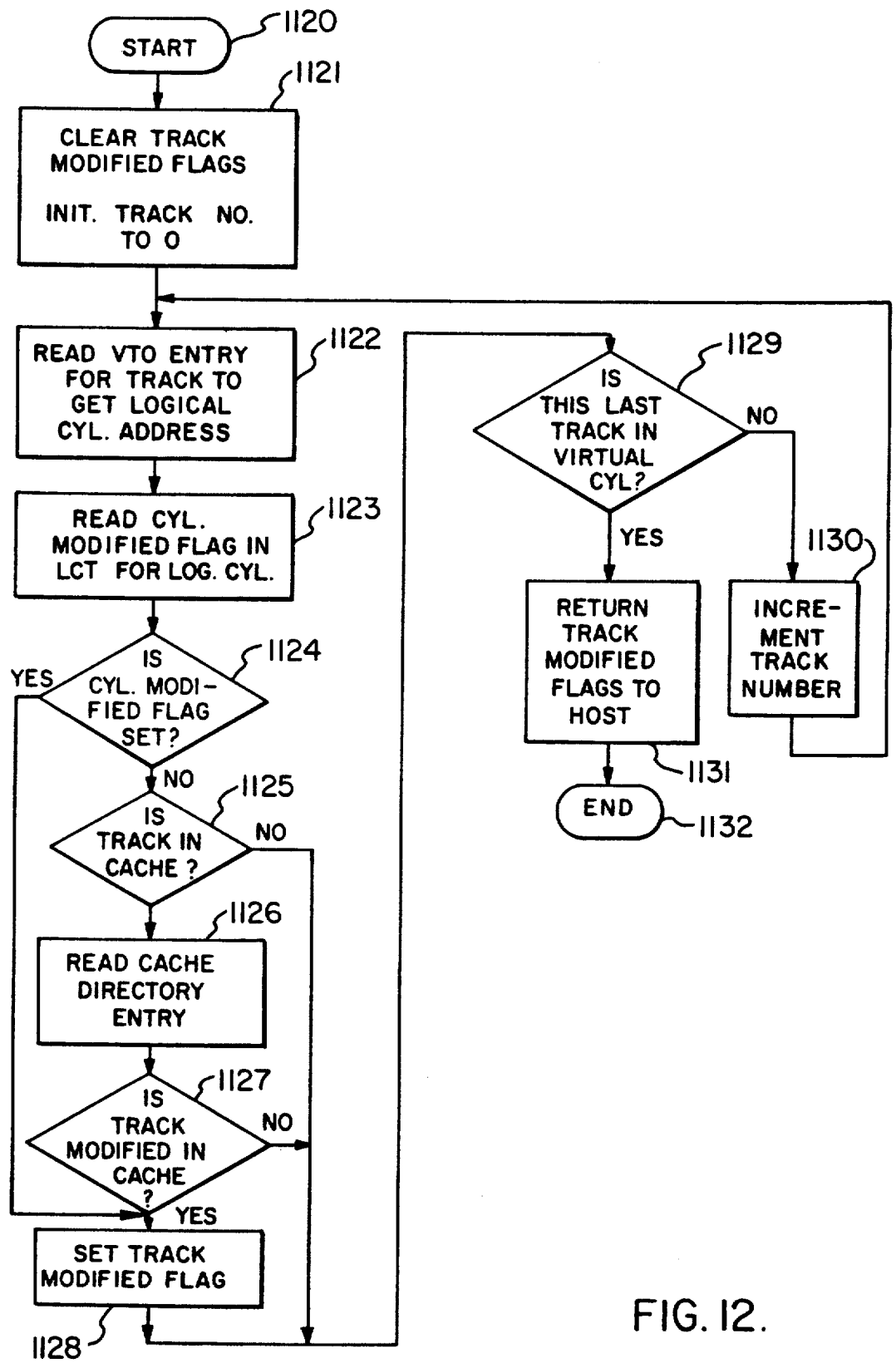
FIGS. 12-15 illustrate in flow diagram form the incremental disk backup process executed by the data storage subsystem.
Figure 13:
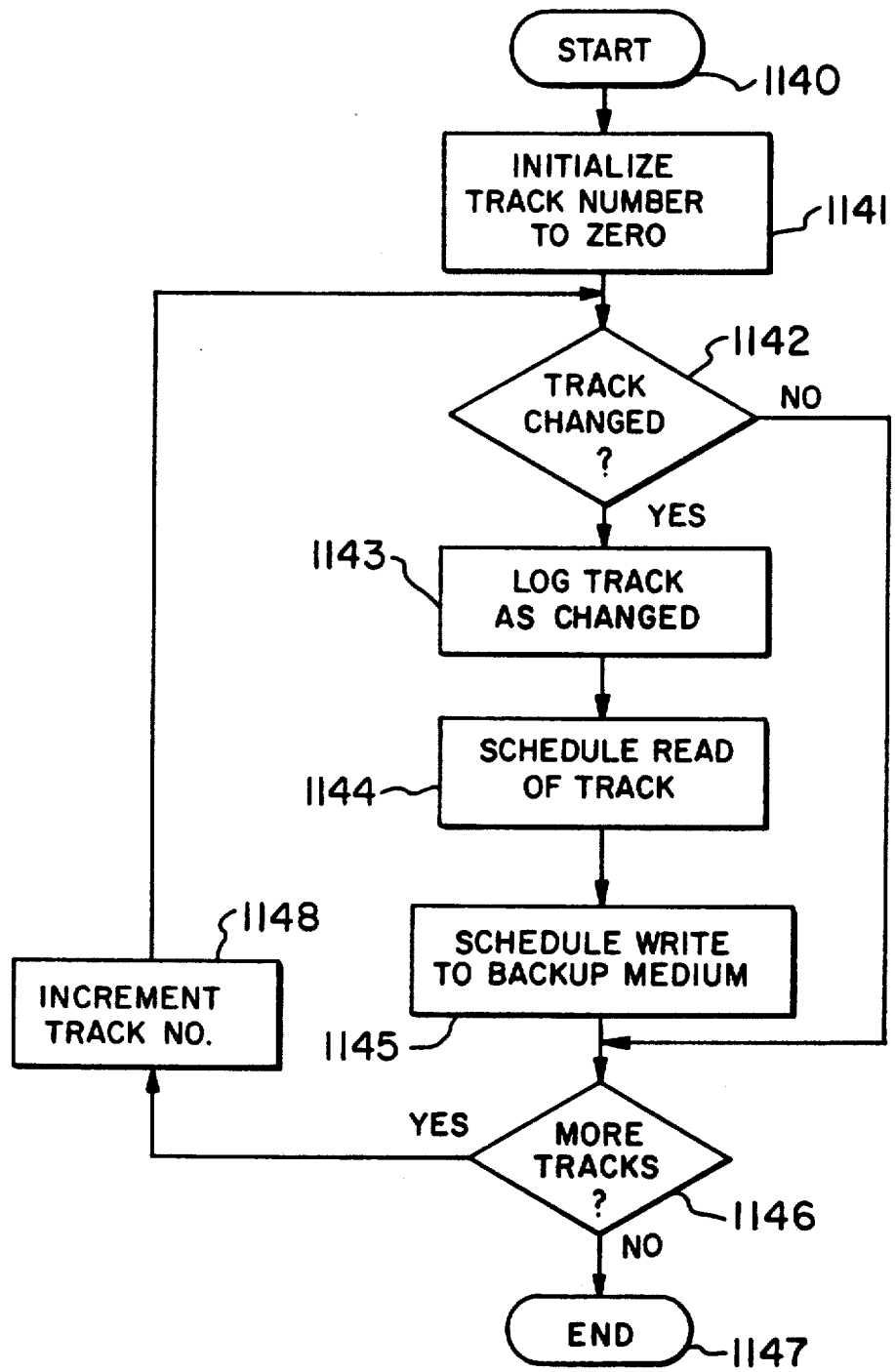
Figure 18:
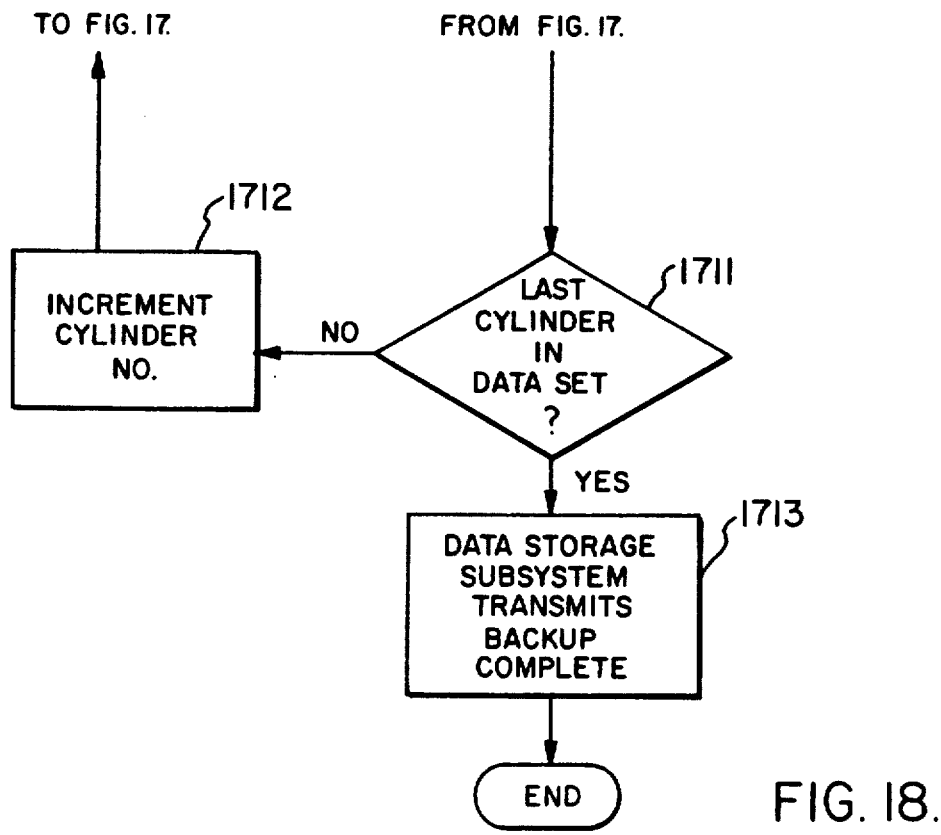
Figure 19:
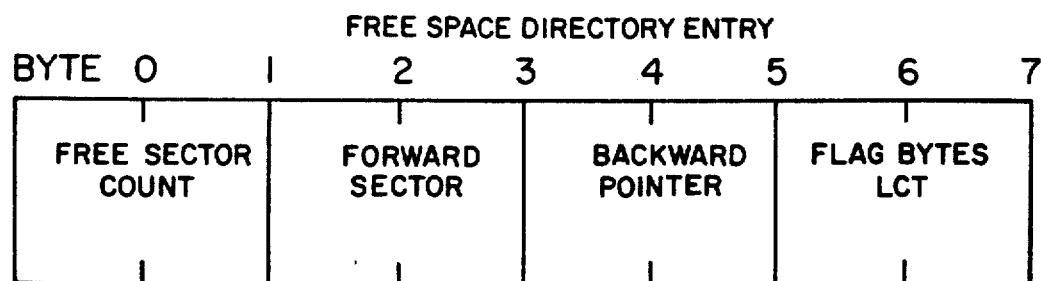

FIG. 13 illustrates in flow diagram form the operational steps taken by control unit 101 of data storage subsystem 100 in response to the report modified tracks command transmitted by host processor 11. This procedure begins at step 1120 wherein the report modified tracks command is received by control unit 101 over data channel 21 from host processor 11. At step 1121, control unit 101 initiates the track number to 0 in response to the host processor 11 transmitting a virtual device number and a virtual cylinder number. At step 1122, control unit 101 reads the virtual track directory entry for this identified track to determine the logical cylinder address. At step 1123, control unit 101 reads the cylinder modified flag status from the logical cylinder table as illustrated in FIG. 18 for the identified logical cylinder determined at step 1122. At step 1124, control unit 101 determines whether the cylinder modified flag is set. If the flag is set, processing jumps to step 1128 but, if it is not processing advances to step 1125 where control unit 101 determines whether this logical track is stored in cache memory 113. If it is not, processing jumps to step 1129 as is discussed below. If the track is stored in cache memory 113, at step 1126 control unit 101 reads the cache directory entry and at step 1127 determines whether the track has been modified while in cache memory 113. If it is not, processing proceeds to step 1129 as is discussed below. If it has been modified in cache processing proceeds to step 1128 as with the cylinder modified flag being set at 1124. At step 1128, control unit 101 sets the track modified flag to indicate to host processor 11 that a modification has taken place to the data contained in this particular track. At step 1129, control unit 101 determines whether this is the last track in this particular identified virtual cylinder. If it is not, at step 1130 the track number is incremented and processing returns to step 1122. Steps 1122-1130 are repeated for all the tracks within this virtual cylinder in this virtual device identified by host processor 11. Once all of the tracks have been so cataloged, at step 1131 control unit 101 transmits data to host processor over data channel 21 indicative of all of the tracks contained within this particular virtual cylinder in this particular virtual device to host processor 11. At step 1132 this subroutine ends and control returns to host processor 11 at step 1109 in FIG. 12.

Perform Updates-Host Processor

Figure 14:
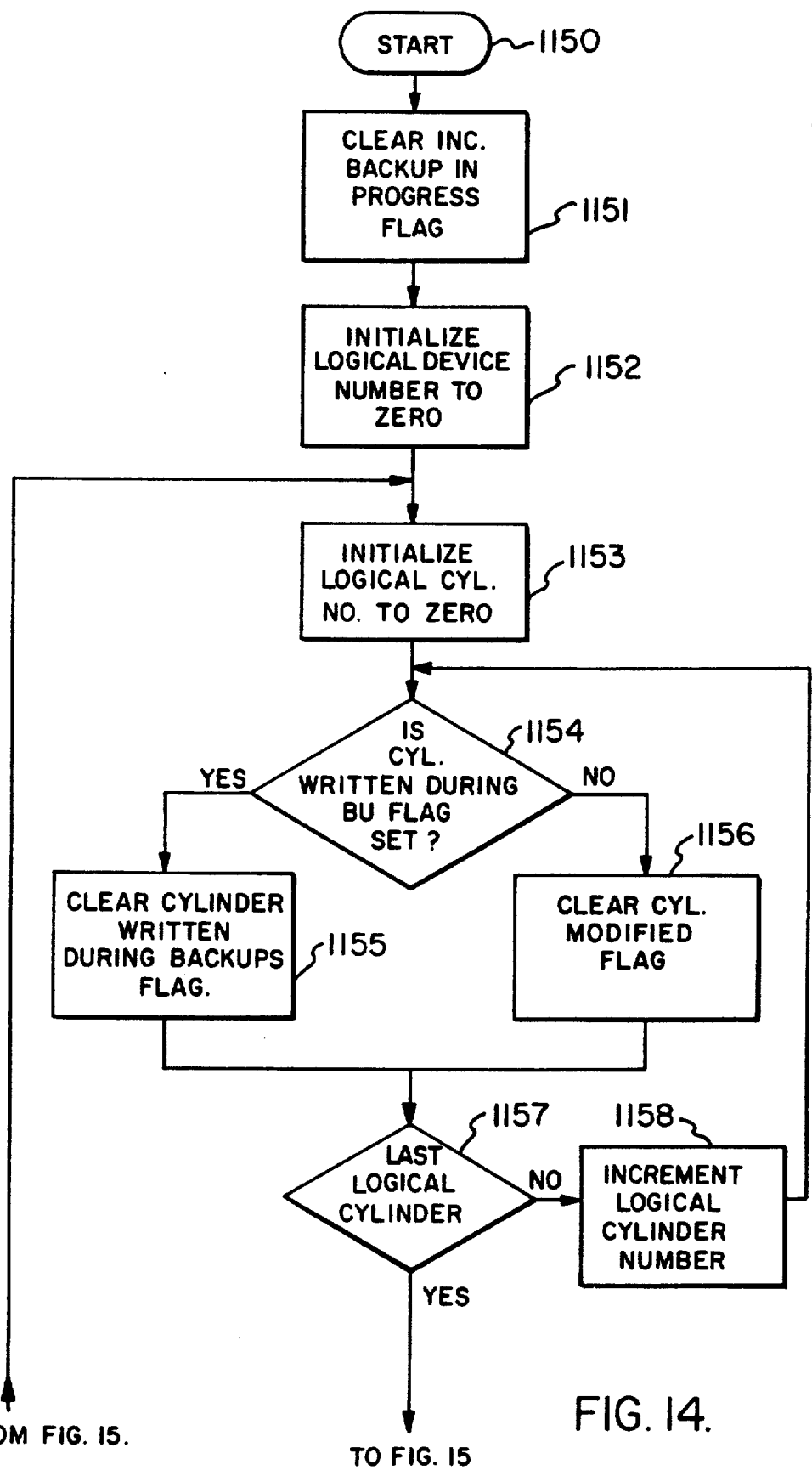

Step 1110 in FIG. 12 is the perform update routine which operationally is implemented in host processor 11. FIG. 14 illustrates in flow diagram form the operational steps taken by host processor 11 to perform the perform update routine. At step 1140, the subroutine is activated as a result of step 1110 on FIG. 12. At step 1141, host processor 11 initializes the track number to 0 and at step 1142 determines whether this particular track for this selected virtual cylinder of a selected virtual device has been changed as identified by the data returned by data storage subsystem 100. If no changes have taken place in this track processing advances to step 1145 as is described below. Assume that the track has been changed and data storage subsystem 100 has provided an indication to host processor that a modification has taken place to data stored in this track. At step 1143, host processor 11 writes a data log entry into its memory indicating that this track has been changed since the last backup procedure was performed. At step 1144, host processor 11 schedules a read and write of this modified track in order to copy the contents of this modified track from the particular storage location in data storage subsystem 100 to a backup medium. At step 1145, host processor 11 determines whether more tracks are contained within the selected virtual cylinder. If more tracks are contained within this virtual cylinder, at step 1146 host processor 11 increments the track number and proceeds to step 1142. Steps 1142-1146 are repeated until all of the tracks contained within this selected virtual cylinder in this selected virtual device have been logged into host processor 11 and the modified tracks contained in this virtual device scheduled to be read and copied to backup medium as defined by the host processor 11. Once there are no more tracks available within this selected virtual cylinder in this selected virtual device processing proceeds to step 1147 where host processor 11 proceeds to step 1111 as shown on FIG. 12.

Begin Incremental Backup Interval-Data Storage Subsystem

Figure 15:
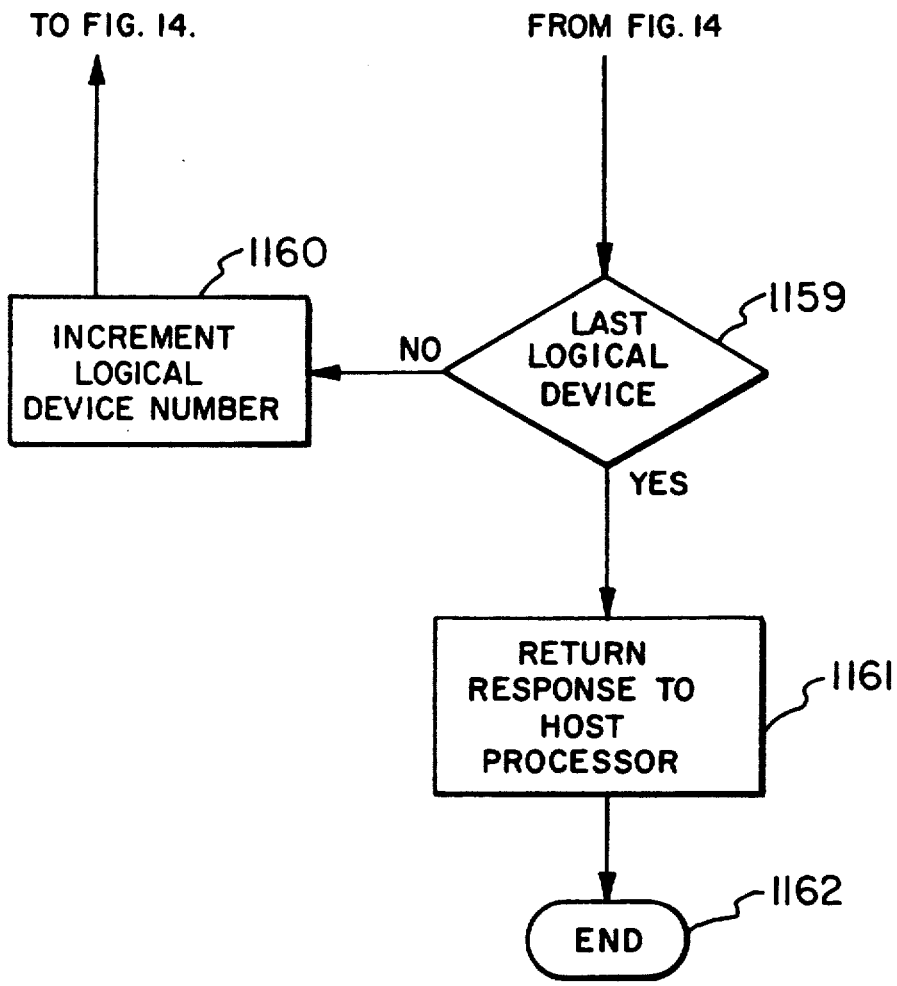

FIG. 15 illustrates in flow diagram form the operational steps taken by data storage subsystem 100 to update the backup status of all of the files contained within data storage subsystem 100 as a result of the backup procedure performed by host processor 11 as described above. At step 1150, control unit 101 receives the command from host processor 11 over data channel 21 indicating that control unit 101 initiate the begin incremental backup interval subroutine. At step 1151, control unit 101 clears the incremental backup in progress flag to thereby indicate to all host processors 11-12 that the incremental backup process has been completed and data storage subsystem 100 has completed the incremental backup. At step 1152, control unit 101 initializes the logical device number to 0 and at step 1153 initializes the logical cylinder number to 0. At step 1154, control unit 101 determines whether this identified logical cylinder was written during the backup interval described above. If it was not, at step 1156 the cylinder modified flag associated with this logical cylinder is cleared and processing advances to step 1157. If the cylinder was written during the backup process described above at step 1155 control unit 101 clears the cylinder written during backup flag and proceeds to step 1157. At step 1157 control unit 101 determines whether this is the last logical cylinder within this particular logical device. If it is not, at step 1158 control unit 101 increments the logical cylinder number and returns to step 1154. Steps 1154-1158 are repeated until all of the logical cylinders contained within this selected logical device have been updated. At step 1159, control unit 101 determines whether this is the last logical device. If it is not, at step 1160, control unit 101 increments the logical device number and returns to step 1153. Steps 1153-1160 are repeated for all of the logical devices contained within data storage subsystem 100. Once the last logical device has been updated, processing advances to step 1161 where control unit 101 transmits a control signal to host processor 11 over data channel 21 indicating that the internal records stored within data storage subsystem 100 have been flagged with a backup status consistent with that noted by host processor 11 as described above. At step 1162, control unit 101 exits the subroutine and returns to normal processing.

Autonomous Incremental Disk Backup

It is obvious from the above description that as an alternative to the host processor controlled incremental disk backup the data storage subsystem 100 can itself perform many of the functional steps performed by host processor 11 in the above described incremental disk backup procedure. In particular, the data storage subsystem 100 can itself perform the actual disk reads and backup medium writes as enumerated in the perform update subroutines of FIGS. 12-15. The host processor 11 transmits a "perform autonomous incremental backup" command to data storage subsystem 100 which command contains data indicative of the volumes or virtual tracks to be backed up, the interval between the incremental backups, and the time of day to do the backups. Control unit 101 marks the volumes identified by host processor 11 as subject to automatic incremental backups and stores the interval parameters in its memory. Control unit 101 initiates a timer to trigger the requested backup functions at the time designated by host processor 11 in the "perform autonomous incremental backup" command. Processor 204 in control unit 101 responds to this trigger by performing the incremental backup functions enumerated in FIGS. 12-15. Since data storage subsystem 100 controls the subroutine independent of host processor 11, a number of the steps in the subroutines of FIGS. 12-15 are not necessary since these tasks are independently activated by data storage subsystem 100. Therefore the exchange of commands and control information between host processor 11 and data storage subsystem 100 are unnecessary. Data storage subsystem 100 performs the incremental backup function by setting the backups in progress flag, then scanning through all of the volumes to locate the volumes identified by host processor 11 as requiring automatic backup. Once one of these identified volumes is located, processor 204 scans all the tracks on this volume to locate tracks that have changed since the last backup procedure. Processor 204 stages the changed tracks into cache memory 113 and then writes these changed tracks to the backup medium as identified by host processor 11 in the "perform autonomous incremental backup" command. When all of the volumes to be backed up have been backed up by this process, processor 204 calls the begin backup interval routine to update the cylinder modified and cylinder written during backup flags contained in the mapping memory. Once these updates have been accomplished, processor 204 loads and starts the timer to begin the next timing interval between incremental backups.

Synchronized Incremental Disk Backup

An alternative to the extended duration backup procedures described above is the method whereby data storage subsystem 100 backs up volumes identified by host processor 11 by first using snapshot copy techniques. Control unit 101 can then stage modified virtual tracks to cache memory 113 and rewrite these changed virtual tracks to a location in a redundancy group that is used for disk backup purposes or write these modified virtual tracks to a tape drive. This can be synchronized with host processing by the use of the above described copy function wherein data storage subsystem 100 provides an instantaneous backup capability by copying virtual track directory entries at electronic speeds to instantaneously create a backup virtual image on a different set of virtual volumes within data storage subsystem 100. As a background process, control unit 101 can then perform the actual physical copying of the modified virtual tracks pursuant to the information recorded in the copy table. This capability thereby enables data storage subsystem 100 to internally perform incremental disk backup on a host synchronized basis, but without the need for host processor 11 to become intimately involved as was the case in the first embodiment described above. Even though disk backup is typically performed as a background process in host processor 11, there are many computer installations wherein the host processor 11 is active continuously and even routine background processes such as incremental disk backup can have a significant negative impact on the capability of the host processor. Furthermore, such background incremental backups may not be fully synchronized with host application processing and are thus quite complex to use for recovery. Therefore the use of the snapshot copy capability of the dynamically mapped virtual memory data storage subsystem provides a further enhanced capability to perform incremental disk backup previously unavailable in data storage subsystems.

Off-Cycle Disk Backup

Figure 17:
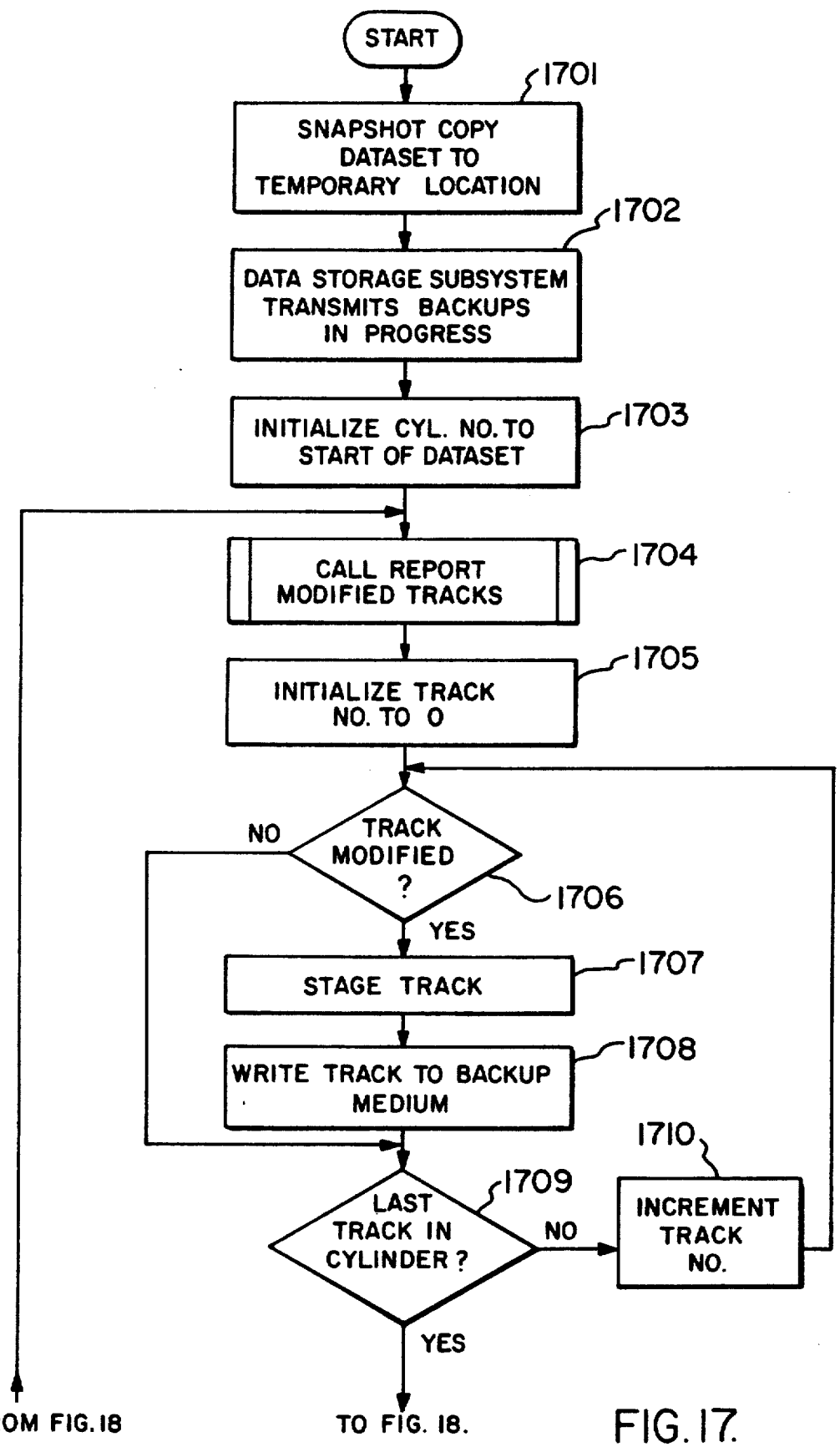
FIGS. 17 and 18 illustrate in flow diagram form the immediate disk backup process executed by the data storage subsystem.

FIGS. 17 and 18 illustrate in flow diagram form an off-cycle backup process that is executed by data storage subsystem 100. The off-cycle disk backup process is an intermediate backup of a volume or one or more data files between the normal incremental backup cycles. This can be initiated by host processor 11 following the running of a computer program thereon which has made significant updates to a data file that is stored on data storage subsystem 100. In order to provide a backup copy of this data file at this specific point in the processing of an application program, host processor 11 transmits a perform off-cycle backup command to data storage subsystem 100. This command includes a volume number and a data file identification or a list of virtual track extents. In response to this received command, data storage subsystem 100 at steps 1701 makes a snapshot copy of the identified data file to a temporary location in the virtual track directory for the volume specified by host processor 11 in the perform off-cycle backup command. At step 1702, data storage subsystem 100 transmits a backups in progress flag to host processor 11, as described above, to indicate to host processor 11 that a backup procedure is active on data storage subsystem 100. At step 1703, processor 204 in control unit 101 initializes the cylinder number to point to the beginning of the identified data file. At step 1704, processor 204 activates the report modified tracks subroutine of FIG. 13 which operates as described above in steps 1120–1132. This process, as described above catalogues all of the tracks on the identified virtual volume that contain tracks that have been modified since the last incremental backup. At step 1705, processor 204 initializes the track number to zero and at step 1706 determines whether this particular track for this selected virtual cylinder of the selected virtual volume has been changed since the last incremental backup. If no changes have taken place in this track, processing advances to step 1709 as is described below. Assume that the track has been changed. At step 1707, processor 204 stages the identified track into cache memory 113 and at step 1708 writes this staged track to the backup medium. At step 1709, processor 204 determines whether more tracks are contained within the selected virtual cylinder. If more tracks are contained within this virtual cylinder, at step 1710 the track number is incremented and processing returns to step 1707. These steps 1707–1710 are repeated until all of the tracks contained within the selected virtual cylinder in the selected virtual volume have been updated. Once all of these tracks are updated, at step 1711, a determination is made whether this cylinder is the last cylinder contained within the data file identified by host processor 11. If it is not, at step 1712 the cylinder is incremented and processing returns to step 1704 and the above described procedure is repeated until all of the tracks in all of the cylinders that contain the identified data file have been backed up. Once all of the identified data file has been backed up, processing exits at step 1713 when data storage subsystem transmits a backup complete message to host processor 11 indicating that this procedure is completed. This off-cycle backup procedure does not vary the operation of the incremental backup procedures described above but simply is an additional, optional capability to provide a backup of a single selected data file at a specific time as designated by host processor 11 independent of the timing of cyclic interval backups.

While specific embodiments of this invention have been disclosed herein, it is expected that those skilled in the art can design other embodiments that differ from this particular embodiment but fall within the scope of the appended claims.

I claim:

1. Apparatus for backing up data records in a dynamically mapped data storage subsystem that stores data records for a host processor, said apparatus comprising:
    a plurality of data storage devices, a subset of said plurality of data storage devices being configured into a plurality of redundancy groups, each redundancy group consisting of at least two data storage devices;

means for writing a stream of data records received from said host processor and redundancy data associated with said received stream of data records in a first memory location in a selected one of said redundancy groups;

means for storing a data record pointer indicative of said first memory location used to store said received stream of data records;

cache memory means;

means, responsive to receipt from said host processor of a request for access to one of said data records stored in said first memory location, for writing said requested data record into said cache memory means;

means, responsive to receipt of modifications to said requested data record received from said host processor, for writing said modified data record in a second memory location in a selected one of said redundancy groups;

means, responsive to said writing means, for indicating in said data record pointer said one data record stored in said first memory location as obsolete;

means for storing a modified data record pointer indicative of said second memory location of said written modified data record;

means, responsive to creation of a modified data record pointer, for storing a copy of a data record whose identity is defined by said modified data record pointer, comprising:
- means for generating a duplicate data record pointer that identifies said second memory location of said modified data record; and
- means for storing said duplicate data record pointer as the identity of a backup copy of said modified data record.

2. The apparatus of claim 1 wherein said data record copy storing means further comprises:
backup memory means;
means for writing said modified data record, as identified by said duplicate data record pointer, to said backup memory means.

3. The apparatus of claim 2 wherein said backup memory means comprises at least one redundancy group in said dynamically mapped data storage subsystem.

4. The apparatus of claim 2 further comprising:
means, responsive to said host processor requesting backup of an identified modified data record, for activating said rewriting means to write said identified modified data record into said backup memory means.

5. The apparatus of claim 2 further comprising:
means, responsive to said host processor requesting backup of said modified data records, for activating said rewriting means to write said modified data records into said backup memory means.

6. The apparatus of claim 1 wherein said data record copy storing means includes:
means for writing said modified data record to a second memory location in one of said redundancy groups;
means for generating a data record pointer that identifies said second memory location in said one of said redundancy groups; and means for storing said generated data record pointer as the identity of a backup copy of said modified data record.

7. The apparatus of claim 8 wherein said data record copy storing means further comprises:
backup memory means connected to said dynamically mapped data storage subsystem;
means for writing said modified data record from said second location to said backup memory means.

8. The apparatus of claim 7 further comprising:
means responsive to said writing means writing one of said modified data records into said backup memory means for expunging the identity of said rewritten modified data record from said storing means.

9. Apparatus for backing up files in a dynamically mapped memory system that stores data records for a host processor, comprising:

a plurality of data storage devices, a subset of said plurality of data storage devices being configured into a plurality of redundancy groups, each redundancy group consisting of at least two data storage devices;

means for writing a stream of data records received from said host processor and redundancy data associated with said received stream of data records in a first memory location in a selected one of said redundancy groups;

means for storing a data record pointer indicative of said first memory location used to store said received stream of data records;

cache memory mans connected to and interconnecting said host processor and said data storage devices for storing data records transmitted therebetween;

backup memory means connected to said cache memory means for storing modified data records which are stored in said dynamically mapped memory system by said host processor;

means, responsive to receipt from said host processor of a request for access to one of said data records stored in said first memory location, for writing said requested data record into said cache memory means from said first memory location;

means, responsive to modifications to said requested data record received from said host processor for writing said modified data record from said cache memory means into a second memory location in a selected one of said redundancy groups;

means, responsive to said writing means, for indicating said one data record stored in said first location in one of said redundancy groups as obsolete;

means for storing a modified data record pointer indicative of said second memory location of said written modified data record;

means, responsive to creation of a modified data record pointer, for storing a copy of a data record whose identity is defined by said modified data record pointer into said backup memory means.

10. The apparatus of claim 9 wherein said backup memory means comprises a selected one of said redundancy groups, said data record copy storing means includes:
means for generating a data record pointer that identifies said second location of said modified data record in said redundancy groups; and means for storing said generated data record pointer as the identity of a backup copy of said modified data record.

11. The apparatus of claim 9 further including:

means, responsive to said rewriting means writing one of said modified data records into said backup memory means, for expunging the identity of said rewritten modified data record from said storing means.

12. The apparatus of claim 9 wherein said backup memory means comprises at least one redundancy group in said dynamically mapped data storage subsystem.

13. The apparatus of claim 9 further comprising:

means, responsive to said host processor requesting backup of an identified modified data record, for activating said rewriting means to write said identified modified data record into said backup memory means.

14. The apparatus of claim 9 further comprising:

means, responsive to said host processor requesting backup of said modified data records, for activating said rewriting means to write said modified data records into said backup memory means.

15. The apparatus of claim 9, wherein said backup memory means comprises at least one tape drive, further comprising:

means connected to and interconnecting said cache memory means and said tape drive for transferring data therebetween;

wherein said writing means includes:

means for staging said modified data record from said second location in a selected one of said redundancy groups to said cache memory means, means for transmitting said staged modified data record from said cache memory means to said transferring means.

16. The apparatus of claim 15 wherein said writing means further includes:

means, responsive to the receipt of a data record backup command from said host processor, for transmitting data to said host processor identifying all modified data records whose identity is stored in said storing means.

17. The apparatus of claim 15 wherein said writing means further includes:

means, responsive to said transmitting means, for expunging said identity of said staged modified data record from said storing means.

18. The apparatus of claim 9 wherein said backup memory means comprises a tape drive connected to said data storage system, said writing means includes:

means for generating a data record pointer that identifies said second location of said modified data record in said redundancy groups; and means for storing said data record pointer as the identity of a backup copy of said modified data record.

19. The apparatus of claim 18 wherein said rewriting means further includes:

means for writing said modified data record, as identified by said data record pointer, to said backup memory means.

20. Apparatus for backing up files in a dynamically mapped data storage subsystem that stores data records for at least one associated data processor, said dynamically mapped data storage subsystem including a plurality of data storage devices, a subset of said plurality of said data storage devices configured into at least one redundancy group, each redundancy group consisting of n+m data storage devices, where n and m are both positive integers with n being greater than 1 and m being equal to or greater than 1, and said data storage devices each including a like plurality of physical tracks to form sets of physical tracks called logical tracks, each logical track having one physical track at the same relative address on each of said n+m data storage devices, for storing data records thereon, said dynamically mapped data storage subsystem generates m redundancy segments using n received streams of data records, selects a first one of said logical tracks in one of said redundancy groups, having at least one set of available physical tracks addressable at the same relative address for each of said n+m data storage devices and writes said n received streams of data records and said m redundancy segments on said n+m data storage devices in said selected set of physical tracks, each stream of data records and redundancy segments at said selected available physical track on a respective one of said n+m data storage devices, comprising:

cache memory means connected to and interconnecting said host processors and said data storage devices for storing data records transmitted therebetween;

backup memory means connected to said cache memory means for storing modified data records which are stored in said dynamically mapped data storage subsystem by said associated host processors;

means, responsive to the receipt from one of said host processors of a request for access to one of said data records stored in said first logical track of one of said redundancy groups, for writing said requested data record into said cache memory means from said first logical track at one physical track of one of said n+m data storage devices of one of said redundancy groups;

means, responsive to modifications to said requested data record, from said requesting host processor, for writing said modified data record from said cache memory means into a second available logical track in a selected one of said redundancy groups;

means responsive to said writing means for indicating said one data record stored in said first logical track as obsolete;

means for storing data indicative of the location of said written modified data record in said second logical track; and means for rewriting at least one modified data record whose identity is stored in said storing means into said backup memory means.

21. The apparatus of claim 20 wherein backup memory means comprises a selected one of said redundancy groups, said rewriting means includes:

means for generating a data record pointer that identifies the physical location of said modified data records in said redundancy groups; and means for storing said data record pointer as the identity of a backup copy of said modified data record.

22. The apparatus of claim 21 wherein said rewriting means further includes:

means for writing said modified data record, as identified by said data record pointer, to said backup memory means.

23. The apparatus of claim 20 further including:

means responsive to said rewriting means writing one of said modified data records into said backup memory means for expunging the identity of said rewritten modified data record from said storing means.

24. The apparatus of claim 20 wherein said backup memory means comprises at least one redundancy group in said dynamically mapped data storage subsystem.

25. The apparatus of claim 20 further including:

means, responsive to one of said associated host processors requesting backup of an identified modified data record, for activating said rewriting means to write said identified modified data record into said backup memory means.

26. The apparatus of claim 20 further including:

means, responsive to one of said associated host processors requesting backup of said modified data records, for activating said rewriting means to write said modified data records into said backup memory means.

27. The apparatus of claim 20, wherein said backup memory means comprises at least one tape drive, further comprising:

means connected to and interconnecting said cache memory means and said tape drive for transferring data therebetween;

wherein said writing means includes:

means for staging said modified data record from said second logical track to said cache memory means, means for transmitting said staged modified data record from said cache memory means to said transferring means.

28. The apparatus of claim 27 wherein said writing means further includes:

means, responsive to the receipt of a data record backup command from said host processor, for transmitting data to said host processor identifying all modified data records whose identity is stored in said storing means.

29. The apparatus of claim 27 wherein said writing means further includes:

means, responsive to said transmitting means, for expunging said identity of said staged modified data record from said storing means.

30. The apparatus of claim 20 wherein said backup memory means comprises a tape drive connected to said data storage system, said writing means includes:

means for generating a data record pointer that identifies said second location of said modified data record in said redundancy groups; and means for storing said data record pointer as the identity of a backup copy of said modified data record.

31. The apparatus of claim 30 wherein said rewriting means further includes:

means for writing said modified data record, as identified by said data record pointer, to said backup memory means.

* * * * *